(12) United States Patent
Yamada

(10) Patent No.: US 12,391,020 B2
(45) Date of Patent: Aug. 19, 2025

(54) PACKING BODY OF COMPOSITE LAMINATE

(71) Applicant: AGC Inc., Tokyo (JP)

(72) Inventor: Kazuo Yamada, Tokyo (JP)

(73) Assignee: AGC Inc., Tokyo (JP)

( * ) Notice: Subject to any disclaimer, the term of this patent is extended or adjusted under 35 U.S.C. 154(b) by 312 days.

(21) Appl. No.: 18/064,045

(22) Filed: Dec. 9, 2022

(65) Prior Publication Data

US 2023/0182432 A1    Jun. 15, 2023

(30) Foreign Application Priority Data

Dec. 13, 2021    (JP) .................................. 2021-202049
Oct. 5, 2022    (JP) .................................. 2022-161252

(51) Int. Cl.
| | | |
|---|---|---|
| *B65B 13/02* | (2006.01) | |
| *B32B 3/06* | (2006.01) | |
| *B32B 17/10* | (2006.01) | |
| *B32B 27/36* | (2006.01) | |
| *B65D 63/00* | (2006.01) | |
| *B65D 85/48* | (2006.01) | |

(52) U.S. Cl.
CPC .............. *B32B 3/06* (2013.01); *B32B 17/10* (2013.01); *B32B 27/36* (2013.01); *B65B 13/02* (2013.01); *B65D 63/00* (2013.01); *B65D 85/48* (2013.01); *B32B 2250/42* (2013.01); *B32B 2255/10* (2013.01); *B32B 2255/26* (2013.01); *B32B 2307/54* (2013.01); *B32B 2307/732* (2013.01); *B32B 2457/00* (2013.01)

(58) Field of Classification Search
CPC ......... B65B 13/00; B65B 13/02; B65B 13/20; B65B 27/08; B32B 3/06; B32B 17/10; B32B 27/36; B32B 2250/42; B32B 2255/10; B32B 2255/26; B32B 2307/54; B32B 2307/732; B32B 2457/00; B65D 63/00; B65D 85/00; B65D 85/48; B65D 71/04; B65D 85/62; B65D 57/002; B65D 19/06; B65D 19/16; B65D 19/36; B65D 19/44

See application file for complete search history.

(56) References Cited

FOREIGN PATENT DOCUMENTS

| JP | 2005132490 A | * | 5/2005 | ............. B65D 19/16 |
| JP | 2005298062 A | * | 10/2005 | ............. B65D 19/06 |
| JP | 2011-63274 A | | 3/2011 | |
| JP | 2018-193544 A | | 12/2018 | |

\* cited by examiner

*Primary Examiner* — Jimmy T Nguyen
(74) *Attorney, Agent, or Firm* — Oblon, McClelland, Maier & Neustadt, L.L.P.

(57) ABSTRACT

A packing body of a composite laminate, including: a bottom supporting portion; a back-surface supporting portion; a pressing portion; and a fastening mechanism. The fastening mechanism is provided in only a central region in an up-down direction, in both of upper and lower regions, or in all of the upper, the central, and the lower regions. An end-to-end dimension from an end portion of the glass sheet in a region corresponding to the fastening position to a nearest end portion of the resin film is 5 mm or more and 30 mm or less. An average value of gap distances, each of which is a distance between facing sheet surfaces adjacent to each other in the region corresponding to the fastening position, is 20 μm or more and 80% or less of a thickness of the resin film before fastening.

24 Claims, 14 Drawing Sheets

PACKING BODY OF COMPOSITE LAMINATE

CROSS-REFERENCE TO RELATED APPLICATIONS

This application is based on and claims priority under 35 USC 119 from Japanese Patent Application No. 2021-202049 filed on Dec. 13, 2021 and Japanese Patent Application No. 2022-161252 filed on Oct. 5, 2022, the contents of which are incorporated herein by reference.

TECHNICAL FIELD

The present invention relates to a packing body of a composite laminate, which supports, in a vertical posture, a composite laminate obtained by laminating a composite including a glass sheet and a resin film disposed on the glass sheet.

BACKGROUND ART

Electronic devices such as a solar cell panel (PV), a liquid crystal panel (LCD), an organic EL panel (OLED), and a reception sensor panel that senses electromagnetic waves, X-rays, ultraviolet rays, visible light, infrared rays, and the like have been reduced in thickness and weight. Along with this, thinning of a support substrate such as a polyimide resin substrate used for an electronic device is also progressing.

In the case where the strength of the support substrate is reduced due to the thinning, the handling property of the support substrate deteriorates, and problems such as deformation of a support substrate and damage of a circuit may occur in a step (member forming step) of forming a member for an electronic device on a support substrate, or the like.

Therefore, in order to improve the handling property of the support substrate, Patent Literature 1 has recently proposed, for example, a technique of using, as a support substrate, a composite in which a resin film such as a polyimide resin is disposed on a main surface of a glass sheet.

In addition, Patent Literature 2 discloses a storage container for storing a plurality of glass sheets, and the composite of glass sheet described above may also be laminated in the storage container and stored as a composite laminate, and further, the composite may be transported by being bundled with a belt so as not to be displaced.

Patent Literature 1: JP2018-193544A
Patent Literature 2: JP2011-63274A

SUMMARY OF INVENTION

In the composite, the resin film is disposed on the main surface excluding a vicinity of an outer edge portion of the glass sheet. Therefore, as described above, when the plurality of composites is laminated and stored in the storage container and bundled with the belt to form a packing form, a space is generated between end portions of the glass sheets of the composites adjacent to each other in a laminating direction. That is, in the composite laminate obtained by laminating the composites, a space is generated between an end portion of a glass sheet of the N-th composite (N is an integer of 1 or more) from the top and an end portion of a glass sheet of the (N+1)-th composite from the top.

In the case where a movement of the composite is to be prevented by using the belt so that the composite is not displaced, the belt stretched across the composite laminate is bent at an edge portion of a member on an inner side of the belt, and a force concentrates on the edge portion. Therefore, cracks or chips may occur in a glass sheet due to deformation of the end portions of the glass sheets between which a space is generated, reduced distance between the glass sheets, contact between the glass sheets during transportation, or the like at a location where the force is concentrated.

Accordingly, an object of the present invention is to provide a packing body of a composite laminate, in which a movement of a composite and contact between glass sheets of the composite during transportation can be prevented, and deformation, cracks, and chips of the glass sheets can be prevented.

The present invention relates to the following configurations.

(1) A packing body of a composite laminate, which supports, in a vertical posture, a composite laminate obtained by laminating a plurality of composites which each include a glass sheet and a resin film disposed on the main surface of a glass sheet, the packing body including:

a bottom supporting portion that is configured to support a downward end surface of the composite laminate;

a back-surface supporting portion that is configured to support a back surface side of the composite laminate in a state in which the main surface of the glass sheet is inclined from a vertical direction;

a pressing portion that is disposed on a front surface side opposite to the back surface side of the composite laminate and is in surface contact with the composite laminate; and a fastening mechanism that applies, at a fastening position in a part of the pressing portion, a fastening force to the composite laminate sandwiched between the pressing portion and the back-surface supporting portion, in which the fastening mechanism is provided in only a central region in an up-down direction of the composite laminate, in both of an upper region and a lower region in the up-down direction, or in all of the upper region, the central region, and the lower region, when the composite laminate is viewed from a main-surface perpendicular direction, which is a direction perpendicular to the main surface of the glass sheet, an end-to-end dimension from an end portion of the glass sheet in a region of the composite laminate corresponding to the fastening position to a nearest end portion of the resin film is 5 mm or more and 30 mm or less, and an average value of gap distances, each of which is a distance between facing sheet surfaces among a plurality of glass sheets adjacent to each other in a region of the composite laminate corresponding to the fastening position, is 20 µm or more and 80% or less of a thickness of the resin film before fastening.

(2) A packing body of a composite laminate, which supports, in a vertical posture, a composite laminate obtained by laminating a plurality of composites which each include a glass sheet and a resin film disposed on a main surface of the glass sheet, with a protective sheet interposed between the composites on the resin film side, the packing body including:

a bottom supporting portion that is configured to support a downward end surface of the composite laminate;

a back-surface supporting portion that is configured to support a back surface side of the composite laminate in a state in which the main surface of the glass sheet is inclined from a vertical direction;

a pressing portion that is disposed on a front surface side opposite to the back surface side of the composite laminate and is in surface contact with the composite laminate; and a fastening mechanism that applies, at a fastening position in a part of the pressing portion, a fastening force to the composite laminate sandwiched between the pressing portion and the back-surface supporting portion, in which the fastening mechanism is provided in only a central region in an up-down direction of the composite laminate, in both of an upper region and a lower region in the up-down direction, or in all of the upper region, the central region, and the lower region, when the composite laminate is viewed from a main-surface perpendicular direction, which is a direction perpendicular to the main surface of the glass sheet, an end-to-end dimension from an end portion of the glass sheet in the region of the composite laminate corresponding to the fastening position to a nearest end portion of the resin film is 5 mm or more and 30 mm or less, and an average value of gap distances, each of which is a distance between the glass sheet in the region of the composite laminate corresponding to the fastening position and the protective sheet in contact with the resin film disposed on the main surface of the glass sheet, is 20 μm or more and is 80% or less of a total thickness of the resin film and the protective sheet before fastening.

According to the packing body of the composite laminate of the present invention, the movement of the composite and the contact between the glass sheets of the composite during transportation can be prevented, and the deformation, cracks, and chips of the glass sheets can be prevented.

DESCRIPTION OF EMBODIMENTS

Hereinafter, embodiments of the present invention will be described in detail with reference to the drawings.

First Embodiment

First, a packing body of a composite laminate according to a first embodiment will be described.

Figure 1:
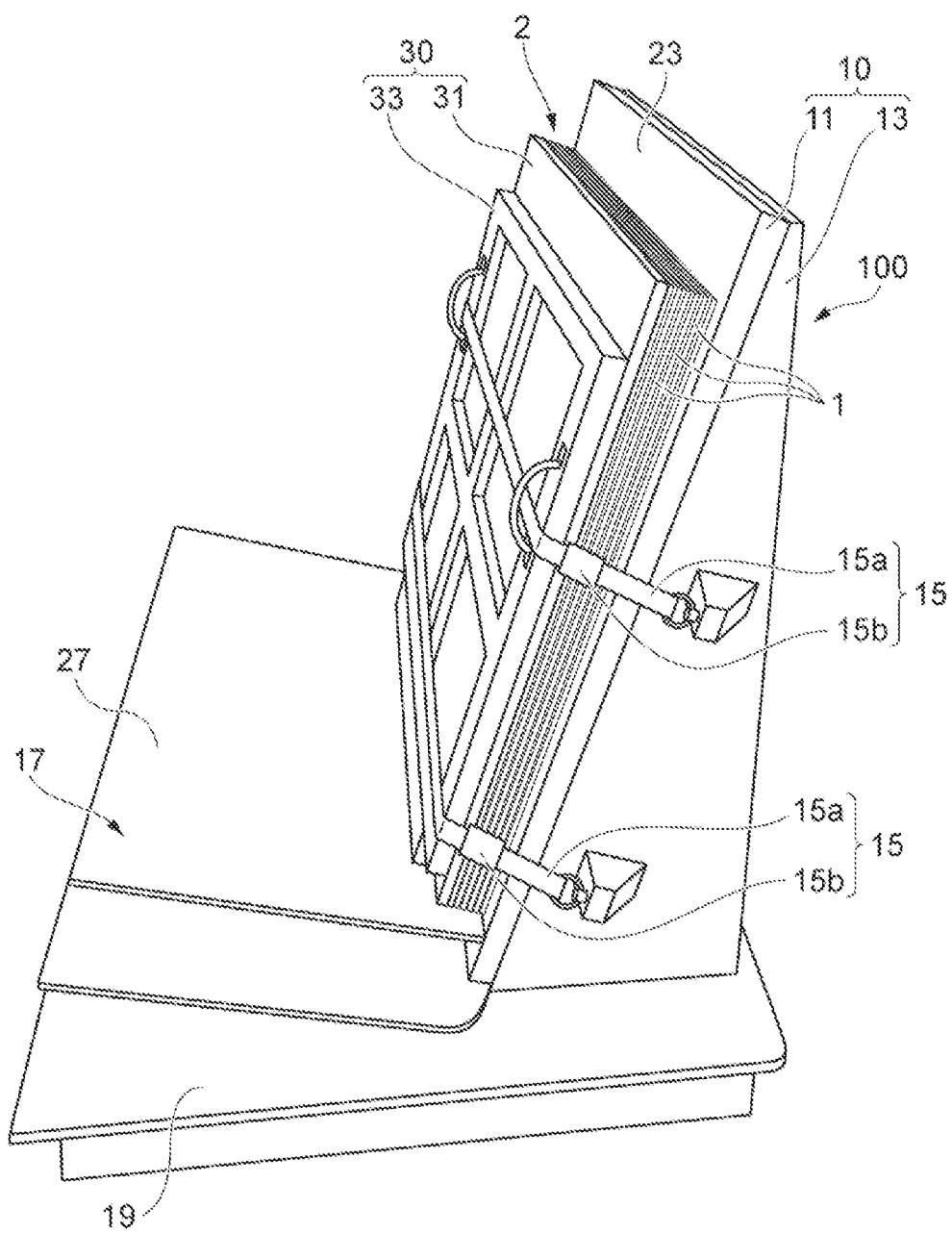
FIG. 1 is a perspective view illustrating a packing body of a composite laminate according to a first embodiment.
Figure 2A:
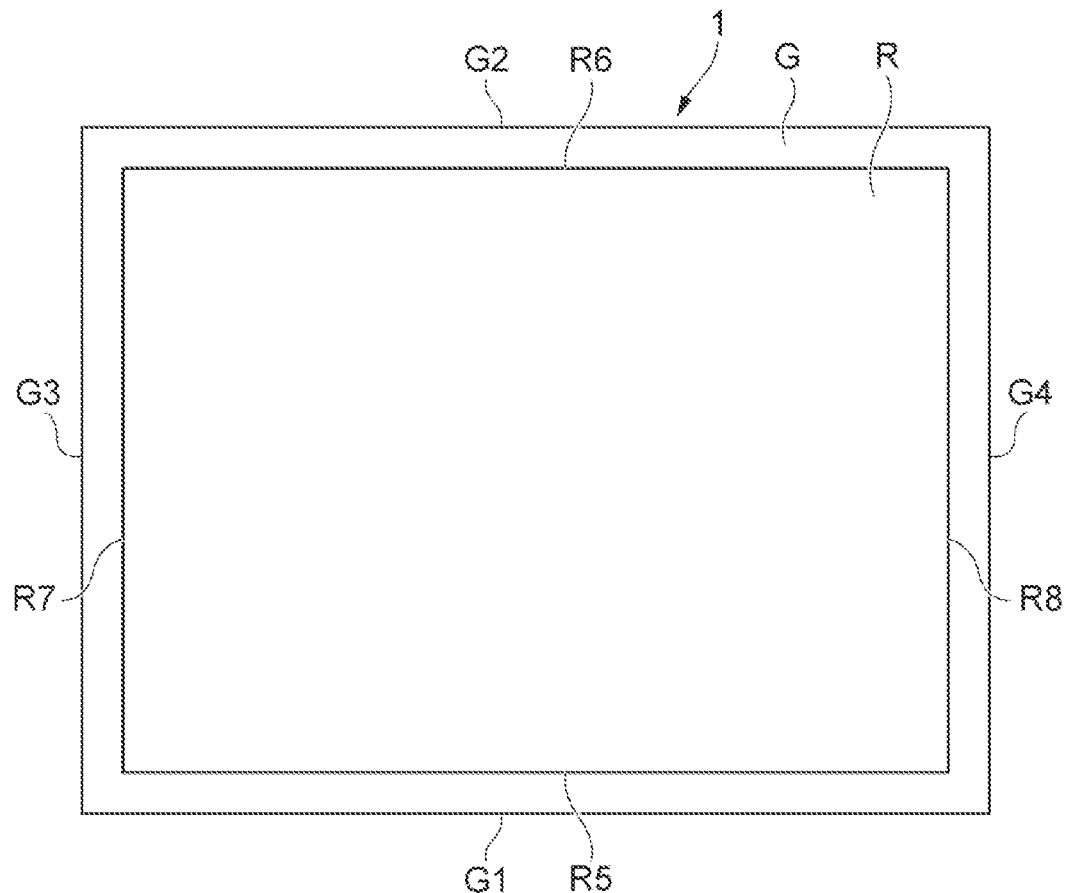
FIG. 2A is a plan view of a main surface side of a composite on which a resin film is provided.
Figure 2B:
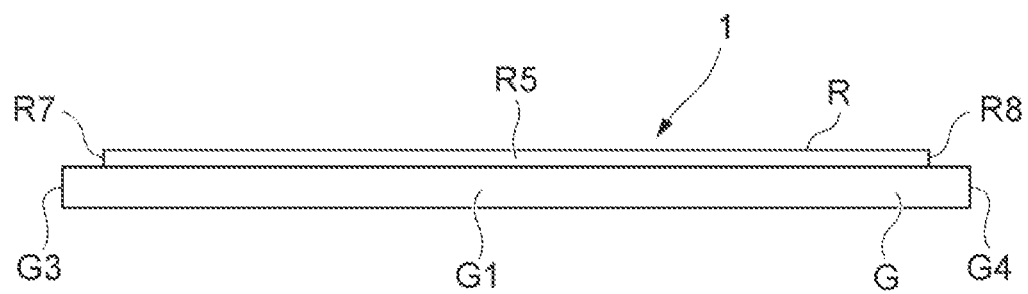
FIG. 2B is a side view of the composite as viewed from a first side.
Figure 3:
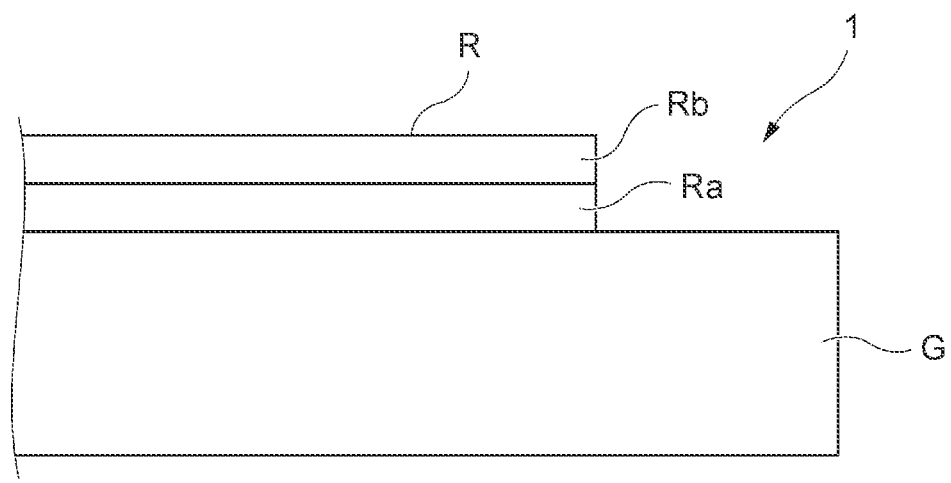
FIG. 3 is a side view of a part of the composite.

FIG. 1 is a perspective view illustrating a packing body of a composite laminate according to the first embodiment. FIG. 2A is a plan view of a main surface side of a composite 1 on which a resin film R is provided. FIG. 2B is a side view of the composite 1 as viewed from a first side G1 side. FIG. 3 is a side view of a part of the composite 1.

As illustrated in FIG. 1, the packing body of the composite laminate according to the first embodiment is obtained by bringing, into a packing form, a composite laminate 2 obtained by laminating a plurality of composites 1. The composite laminate 2 stored in a storage container 100 and formed into a packing body is loaded on a transport vehicle (for example, a trailer or a truck), a ship, or the like, and is transported and conveyed.

As illustrated in FIGS. 2A and 2B, the composite 1 constituting the composite laminate 2 is a plate-shaped body including a glass sheet G and the resin film R disposed on a main surface of the glass sheet G. The composite 1 is used as a support substrate, for example, in a step of forming an electronic device member.

The glass sheet G has a rectangular shape when viewed from a main-surface perpendicular direction which is a direction perpendicular to the main surface, and includes a first side G1 and a second side G2 parallel to each other, and a third side G3 and a fourth side G4 parallel to each other. The glass plate G of the present embodiment is, for example, a large-sized glass sheet having a sixth generation size (long side of 1,850 mm and short side of 1,500 mm), and has a thickness of 0.3 mm or more and 1.0 mm or less. The Young's modulus of the glass sheet G of the present embodiment is 60 GPa or more and 95 GPa or less. The glass constituting the glass sheet G is not particularly limited, and for example, known glass such as alkali-free glass, soda-lime glass, and borosilicate glass can be used. Among them, the alkali-free glass is preferable.

The resin film R has a rectangular shape when viewed from the direction perpendicular to the main surface of the glass sheet G, and is disposed on the main surface excluding a region along an outer edge portion of the glass sheet G. The resin film R includes a fifth side R5 and a sixth side R6 that are parallel to the first side G1 of the glass sheet G, and a seventh side R7 and an eighth side R8 that are parallel to the third side G3 of the glass sheet G. The resin film R of the present embodiment has a thickness of, for example, 10 μm or more and 120 μm or less. The Young's modulus of the resin film R of the present embodiment is 0.1 GPa or more and 7 GPa or less. The term "parallel" as used herein refers to a relationship in which they are arranged side by side, and may be a relationship in which they are parallel to each other.

As illustrated in FIG. 3, the resin film R disposed on the main surface of the glass sheet G includes a first resin film Ra on which an electronic device member is to be formed, and a second resin film Rb releasably formed on the first resin film Ra. The first resin film Ra is, for example, a silicone-based resin, and the second resin film Rb is, for example, a polyethylene terephthalate (PET) film. The second resin film Rb is a protective film that protects the first resin film Ra. That is, in the resin film R, the first resin film Ra on which the electronic device member is to be formed is covered and protected by the second resin film Rb.

When the composite 1 is used as a support substrate for forming an electronic device, the second resin film Rb is released from the first resin film Ra, and an electronic device such as an organic EL (OLED) is formed on the first resin film Ra. After the electronic device is formed on the first resin film Ra, the electronic device is mechanically released from the first resin film Ra. In this manner, when the composite 1 in which the resin film R is provided on the glass sheet G is used as a support substrate for forming an electronic device, the formed electronic device can be easily released from the support substrate as compared with a case in which the electronic device is separated from the support substrate by an expensive laser device.

The storage container 100 illustrated in FIG. 1 is placed on an upper surface of a pedestal 19. The storage container 100 includes a back-surface supporting portion 10, a bottom supporting portion 17 that is a bottom plate, a pressing portion 30, and a fastening mechanism 15.

The back-surface supporting portion 10 includes a back-surface supporting member 13 and a plate-shaped back receiving member 11. The back-surface supporting member 13 supports a back surface of the composite laminate 2 via the back receiving member 11 in a state in which the main surface of the glass sheet G is inclined from a vertical direction. A side of the back receiving member 11 opposite to the back-surface supporting member 13 serves as a receiving surface 23 for the composite laminate 2. The receiving surface 23 may include a buffer sheet (not illustrated).

The back-surface supporting portion 10 is in surface contact with the composite laminate 2 and supports the composite laminate 2 in a vertical posture in which the composite laminate 2 stands against the back receiving member 11. The back-surface supporting member 13 and the bottom supporting portion 17 are preferably made of a material having load bearing properties (for example, a metal material such as an iron material and an aluminum alloy material, or a resin material).

Here, with respect to the laminating direction of the composite 1, a pressing portion 30 side of the composite laminate 2 is also referred to as a "front side" or a "front surface side", and a back-surface supporting portion 10 side is also referred to as a "back surface side".

The bottom supporting portion 17 is provided on a front side (support side of the composite laminate 2) of a lower end of the back receiving member 11 on the upper part of the pedestal 19. The bottom supporting portion 17 is made of, for example, a plate material, and an upper surface of the plate material serves as a placement surface 27 for the composite laminate 2. The bottom supporting portion 17 is disposed in a state in which the placement surface 27 is inclined from the upper surface of the pedestal 19. The placement surface 27 preferably includes a buffer sheet (not illustrated).

An angle formed by the receiving surface 23 of the back receiving member 11 and the placement surface 27 of the bottom supporting portion 17 is preferably about 90°. A side surface of the back-surface supporting member 13 for supporting the back receiving member 11 preferably forms an angle at which an inclination angle θ between the main surface of the glass sheet G of the composite laminate 2 and the vertical direction is 450 or more and 80° or less (see FIG. 4 described later). By setting the inclination angle, the composite laminate 2 can be stably supported by the back-surface supporting portion 10.

In this manner, the composite laminate 2 obtained by laminating the composites 1 is placed on the bottom supporting portion 17, and is stored in the storage container 100 in a vertical posture in which the composite laminate 2 stands against the back-surface supporting portion 10.

The pressing portion 30 is disposed on the front surface side (the side opposite to the back-surface supporting portion 10 side) of the composite laminate 2. The pressing portion 30 includes a pressing frame 33 and a resin plate 31 serving as a buffer member disposed between the pressing frame 33 and the composite laminate 2. The pressing frame 33 is preferably made of a material (for example, aluminum, an aluminum alloy material, a resin material, or the like) that is lightweight and difficult to deform.

The pressing portion 30 is pressed against the composite laminate 2 by fastening with the fastening mechanism 15, and presses the composite laminate 2 toward the back-surface supporting portion 10.

The fastening mechanism 15 generates a fastening force for sandwiching the composite laminate 2 supported by the back-surface supporting portion 10 between the pressing portion 30 and the back-surface supporting portion 10. The fastening mechanism 15 illustrated in the present embodiment includes a belt-shaped belt 15a, and a tension applying portion 15b that applies tension to the belt 15a. In the present example, the fastening mechanisms 15 are disposed at two locations (an upper region and a lower region) at different height positions of the composite laminate 2, and the composite laminate 2 is fixed to the back-surface supporting portion 10 by stretching the two belts 15a across the pressing frame 33 in front of the composite laminate 2 in a horizontal direction. Alternatively, one belt may be stretched horizontally on a central region in a height direction of the composite laminate 2 and fixed. In addition, belts may be stretched across the upper region, the lower region, and the central region of the composite laminate 2, respectively.

Both ends of the belt 15a are fixed to the back-surface supporting member 13, and a tension applying portion 15b such as a ratchet is provided on a part of the belt such as an end portion on one side. Tension is applied to the belt 15a by the tension applying portion 15b. The belt 15a to which the tension is applied generates a fastening force for pressing the composite laminate 2 against the back-surface supporting portion 10, holds the composite laminate 2 in a state of being fixed to the back-surface supporting portion 10, and stores the composite laminate 2 in the storage container 100.

The point of action of the fastening force preferably includes an end portion region of the glass sheet G, and may be only the end portion region. The end portion region of the glass sheet G is a region from the end of the glass sheet G to an end of the resin film R in a plan view of the glass sheet G, and means a region between the third side G3 of the glass sheet G and the seventh side of the resin film R and a region between the fourth side G4 of the glass sheet G and the eighth side R8 of the resin film R illustrated in FIG. 2A. In the case where the point of action of the fastening force includes the end portion region of the glass sheet G, the composite laminate 2 can be strongly fastened in the end portion region of the glass sheet G. In such a configuration in which the fastening force is applied to the end portion region of the glass sheet G, the configuration of the fastening mechanism 15 is not complicated and the fastening force can be easily adjusted as compared with, for example, a case in which the glass sheet G is fastened at the entire main surface or a center of the main surface. Even when the fastening force can be applied only to the end portion region of the glass sheet G, the composite laminate 2 can be stably fixed by satisfying the following conditions such as the end-to-end dimension from the end portion of the glass sheet G to the nearest end portion of the resin film R, and the distance between facing plate surfaces of the glass sheets.

The pressing portion 30 preferably has a structure that comes into surface contact with the composite laminate 2. The pressing frame 33 is not limited to the lattice-shaped frame body illustrated in the drawings, and may have a plate shape or a block shape. In addition, instead of the pressing frame 33, for example, a member made of another material or having another shape, such as a cardboard or a buffer plate which is provided at a corner portion of the composite laminate 2 intersecting the belt 15a, and which is bent in an L shape, may be used.

In this manner, the packing body of the composite laminate 2 is transported and conveyed while the composite laminate 2 obtained by laminating the plurality of composites 1 each having the resin film R disposed on the main surface of the glass sheet G is fixed in the vertical posture. By fixing the composite laminate 2 in the vertical posture, the space efficiency for disposing the composite laminate 2 is improved.

Next, a specific storage state of the composite laminate 2 in the storage container 100 will be described. In the following description, the pressing portion 30 (the resin plate 31 and the pressing frame 33) and the like are schematically illustrated or not illustrated. In addition, the number of composites 1 illustrated in each drawing is smaller than the actual number. In each drawing, a direction parallel to the first side G1 of the glass sheet G of the composite 1 is defined as an X-axis direction, a direction orthogonal to the X-axis direction and along the main surface of the glass sheet G is defined as a Y-axis direction, and a main-surface perpendicular direction that is perpendicular to the main surface of the glass sheet G is defined as a Z-axis direction.

Figure 4:
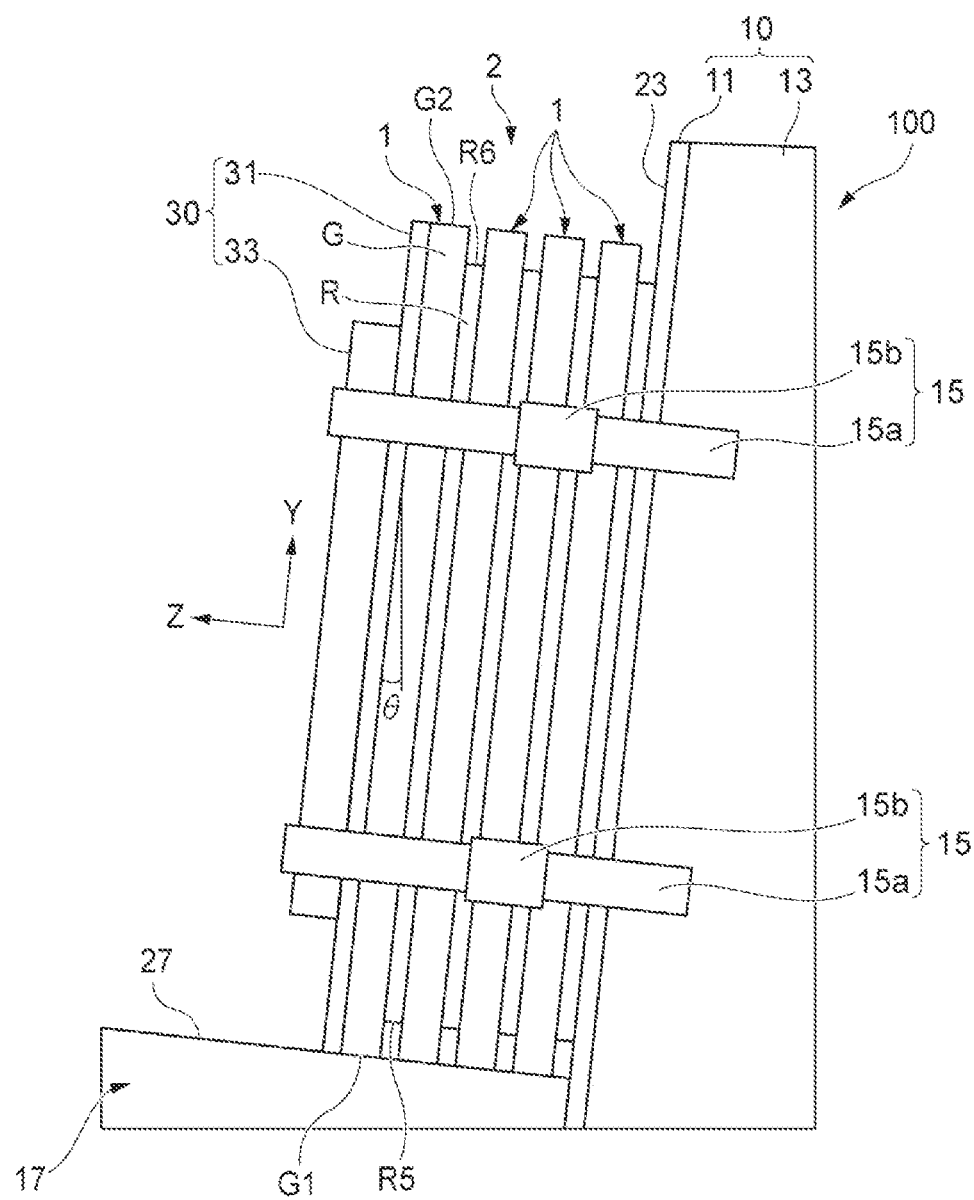
FIG. 4 is a schematic side view of the packing body of the composite laminate according to the first embodiment.
Figure 5:
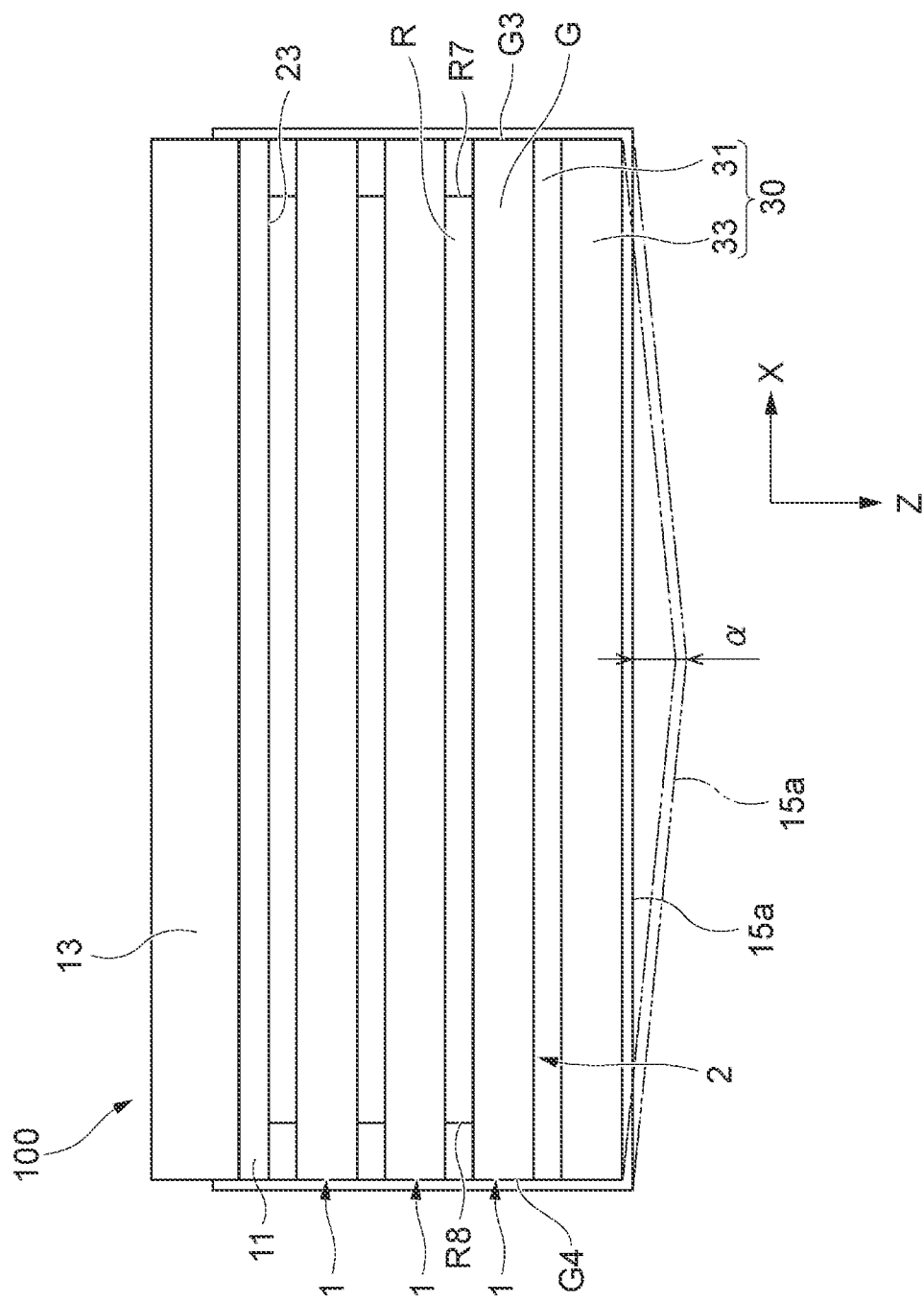
FIG. 5 is a schematic plan view of the packing body of the composite laminate according to the first embodiment.
Figure 6:
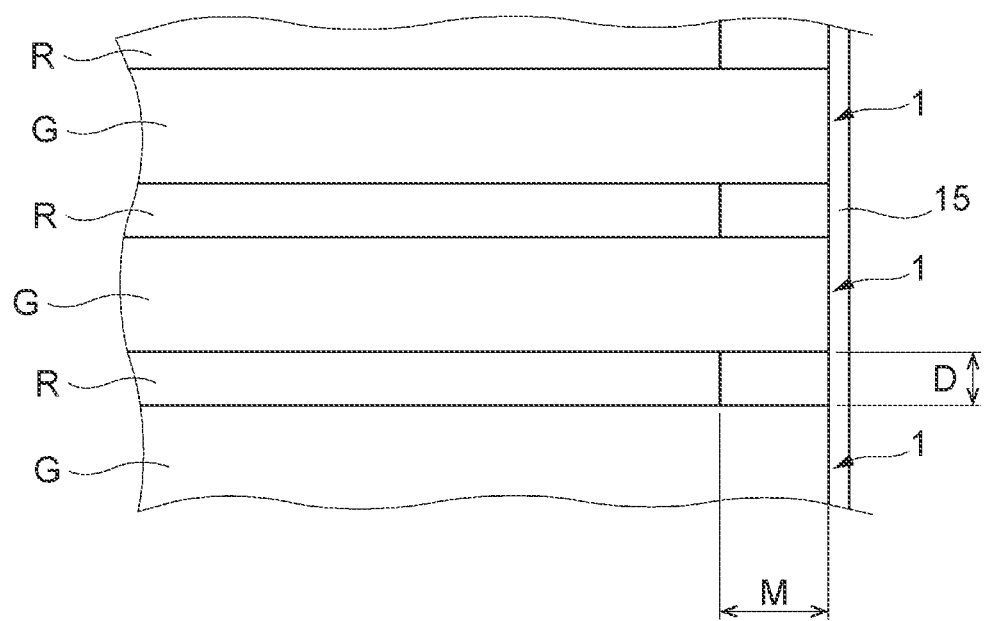
FIG. 6 is a schematic plan view of a part of the packing body of the composite laminate according to the first embodiment.
Figure 7:
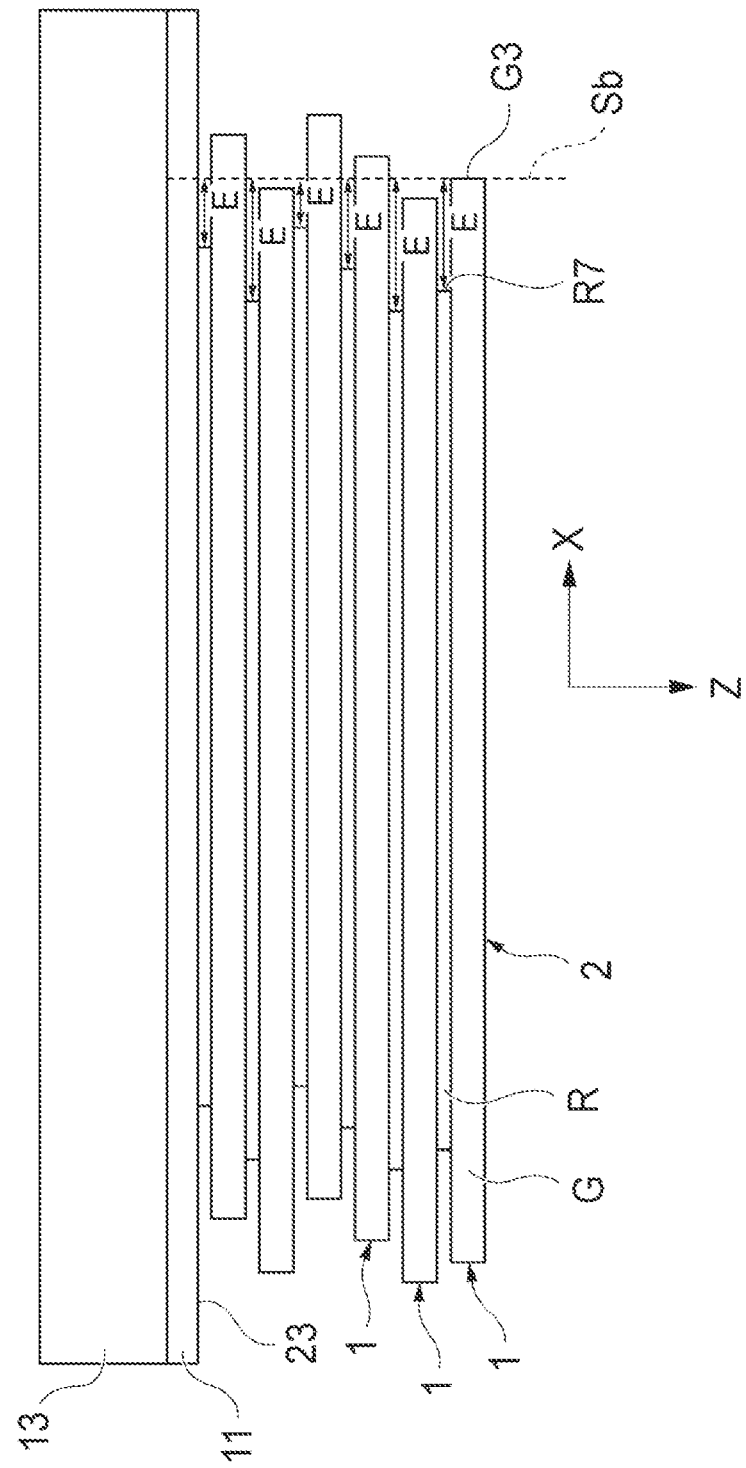
FIG. 7 is a schematic view of the composite laminate stored in a storage container as viewed from above.

FIG. 4 is a schematic side view of the packing body of the composite laminate 2 according to the first embodiment. FIG. 5 is a schematic plan view of the packing body of the composite laminate 2 according to the first embodiment. FIG. 6 is a schematic plan view of a part of the packing body of the composite laminate 2 according to the first embodiment. FIG. 7 is a schematic view of the composite laminate 2 stored in the storage container 100 as viewed from above.

As illustrated in FIGS. 4 and 5, in a state in which the first side G1 of the glass sheet G is directed downward, the composites 1 are preferably laminated such that a resin film R disposed on one main surface of a glass sheet G is preferably faces another main surface (surface on which a resin film R is not formed) of an adjacent glass sheet G. In the storage container 100, the composites 1 are laminated on each other in a state in which the first side G1 of the glass sheet G, which is a downward end surface, is brought into contact with the bottom supporting portion 17, and the main surfaces of the glass sheets G are inclined from the vertical direction, and placed as the composite laminate 2.

In the case where the composite laminate 2 is disposed in a direction in which one main surface side of each composite 1 on which the resin film R is disposed faces the back receiving member 11, the other main surface (the surface on which the resin film R is not formed) of the glass sheet G becomes a front surface when a composite 1 is taken out from the storage container 100. Therefore, since the resin film R is not disposed on the take-out side of the glass sheet G, the glass sheet G can be easily gripped without being conscious of interference (contact) with the resin film R. As a result, the work of taking out the individual composites 1 from the composite laminate 2 can be simplified.

The composite laminate 2 placed in the storage container 100 is fastened between the pressing portion 30 and the back-surface supporting portion 10 by stretching the belt 15a across the front surface of the composite laminate 2, and is held by the back-surface supporting member 13 while being pressed against the back receiving member 11. Accordingly, the composite laminate 2 forms a packing body stored in the storage container 100. At this time, as illustrated in FIG. 5, the fastening mechanism 15 fastens the composite laminate 2 such that a displacement a at a pulled location is 20 mm when the fastening mechanism 15 is pulled forward (Z direction) at 50 N at a center in the width direction (X direction) of the composite laminate 2 (see FIG. 5). Accordingly, each of the composites 1 constituting the composite laminate 2 is pressed against the back receiving member 11 of the storage container 100 in a laminated state, so that each of the composites 1 is favorably held.

As illustrated in FIG. 6, when the composite laminate 2 formed as a packing body is viewed from the main-surface perpendicular direction (Z direction) perpendicular to the main surface of the glass sheet G of the composite 1, an end-to-end dimension M from an end portion of a glass sheet G, which intersects the belt 15a and serves as the fastening position, to the nearest end of the resin film R is 5 mm or more and 30 mm or less. When the composite laminate 2 in the state of a packing body is viewed from the main-surface perpendicular direction (Z direction) of the glass sheet G of the composite 1, an average value of distances in the main-surface perpendicular direction between an N-th (N is an integer of 1 or more) glass sheet G from the top and an (N+1)-th glass sheet G from the top, that is, distances D (also referred to as a gap distance) between plate surfaces facing each other of a plurality of glass sheets G adjacent to each other is 20 μm or more, and is 80% or less of a thickness of the resin film R in a non-stress state before fastening with the fastening mechanism 15, at the end portion of the glass sheet G intersecting the belt 15a and serving as the fastening position.

Here, the average value of the gap distances D (the same applies to a second embodiment described later) may be an average value of distances between the plate surfaces for all the glass sheets G included in the composite laminate 2, for example, an average value of the gap distances D at N−1 locations in the case where N glass sheets G are laminated, or an average value of the gap distances D measured for any n glass sheets G (for example, n=10) in the order of lamination.

In this manner, the composite laminate 2 is fastened with a strength such that the average value of the gap distances D, each of which is a distance between the glass sheets G adjacent to each other of the composite laminate 2, is 20 μm or more and is reduced to 80% or less of the thickness of the resin film R. Accordingly, the composite laminate 2 can be reliably fixed to the back-surface supporting member 13. Even when the composite laminate 2 is transported in the state of the packing body stored in the storage container 100, the movement of the laminated composites 1 and the contact between the glass sheets G are prevented. Therefore, deformation, cracks, and chips of the glass sheet G can be prevented.

In the case where the above-described end-to-end dimension M is less than 5 mm, the resin film R is disposed close to the end portion of the glass sheet G. Therefore, damage such as damage to the resin film R during handling of the glass sheet G is likely to occur. In addition, when an operator handles the glass sheet G particularly in consideration of the damage of the resin film R, the workability of handling the glass sheet G deteriorates. On the other hand, in the case where the end-to-end dimension M is more than 30 mm, the distance from the end portion of the glass sheet G to the resin film R is increased, the end portions of the glass sheets G are likely to be bent during fastening of the composite laminate 2, and damage such as cracks of the glass sheet G are likely to be caused. Therefore, the end-to-end dimension M is preferably 5 mm or more and 30 mm or less.

Further, as illustrated in FIG. 7, in the composite laminate 2 in the state of the packing body, a difference between a maximum value Emax and a minimum value Emin of the distances E between a reference plane Sb perpendicular to the X axis parallel to the first sides G1 of the glass sheets G and positions of the seventh sides R7 in the X axis direction as viewed from the reference plane Sb is preferably 10 mm or less. For example, in the case where a seventh side R7 of resin film on a glass sheet G disposed farthest from the back-surface supporting member 13 among the plurality of glass sheets G in the composite laminate 2 is set as a reference plane, a difference between a maximum value Emax and a minimum value Emin of the distances E between the seventh side R7, which is the reference plane, and seventh sides R7 of resin films on other glass sheets G is preferably set to 10 mm or less. In this manner, the composite laminate 2 is in a state in which variations in the positions of the laminated composites 1 in the lateral direction (X direction) are prevented in the state of the packing body stored in the storage container 100. Accordingly, stress concentration on the glass sheets G due to lateral displacement of the composites 1 can be prevented.

In the case where the Young's modulus of the second resin film Rb is less than 0.1 GPa, the first resin film Ra is likely to deform due to the weight of the laminate obtained by laminating the composites or the fastening force. In the case where the first resin film Ra is deformed, a device formed on the first resin film Ra may be defective. In the case where the Young's modulus of the first resin film Ra is more than 7 GPa, warpage of the composite due to expansion or contraction of the second resin film Rb based on the temperature or humidity tends to increase. In the case where the warpage of the composite increases, it may be less likely to hold and transport the substrate in a device manufacturing process. For the above reasons, the Young's modulus of the second resin film Rb is preferably 0.1 GPa or more and 7 GPa or less.

As described above, according to the packing body of the composite laminate 2 in the first embodiment, the movement of the composites 1 and the contact between the glass sheets G during transportation and conveyance can be prevented, and the deformation, cracks, and chips of the glass sheets G can be prevented.

Second Embodiment

Next, a packing body of a composite laminate according to the second embodiment will be described.

In the following description, the same members or portions as those in the first embodiment are denoted by the same reference numerals, and the description thereof will be omitted or simplified.

Figure 8:
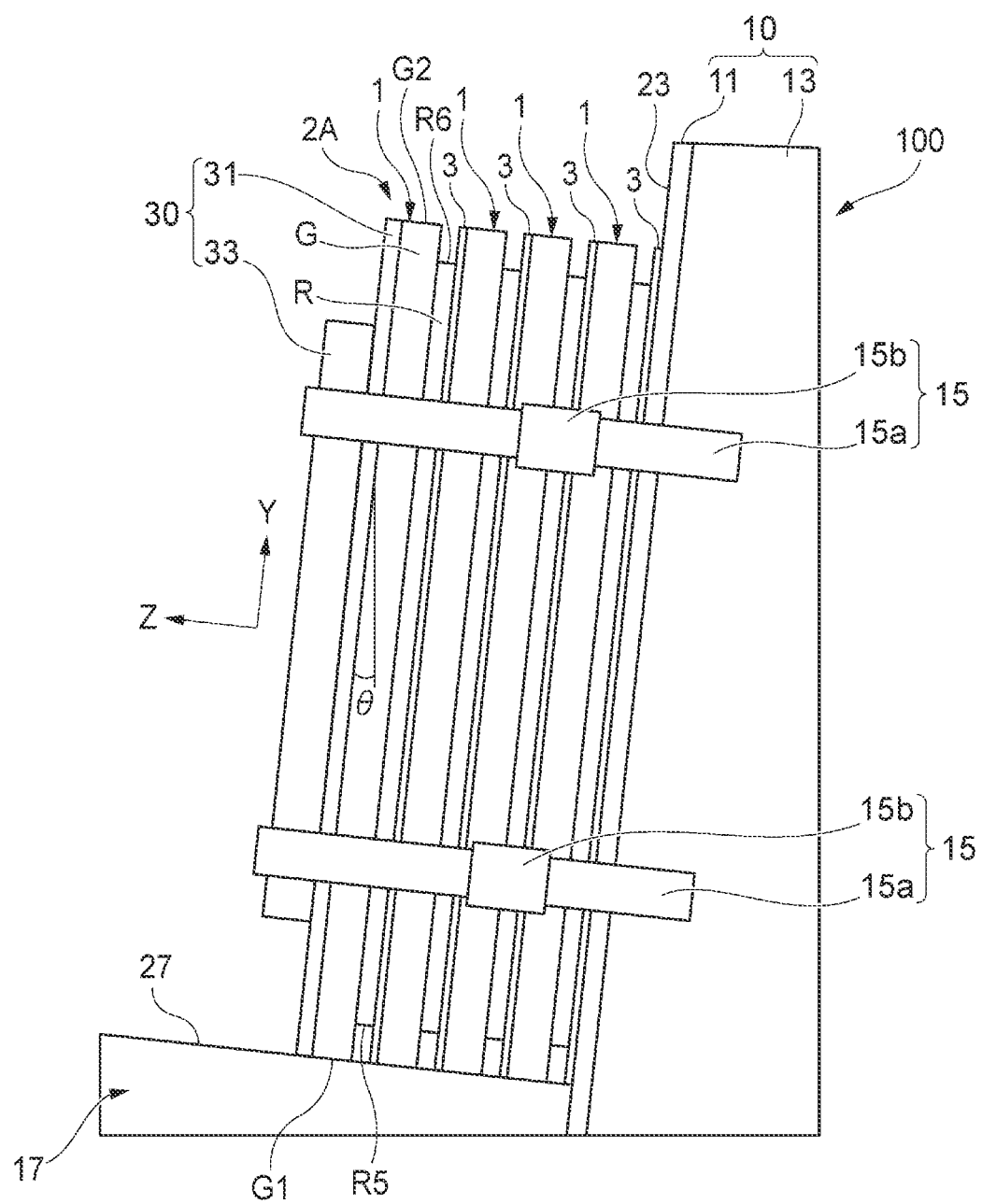
FIG. 8 is a schematic side view of a packing body of a composite laminate according to a second embodiment.
Figure 9:
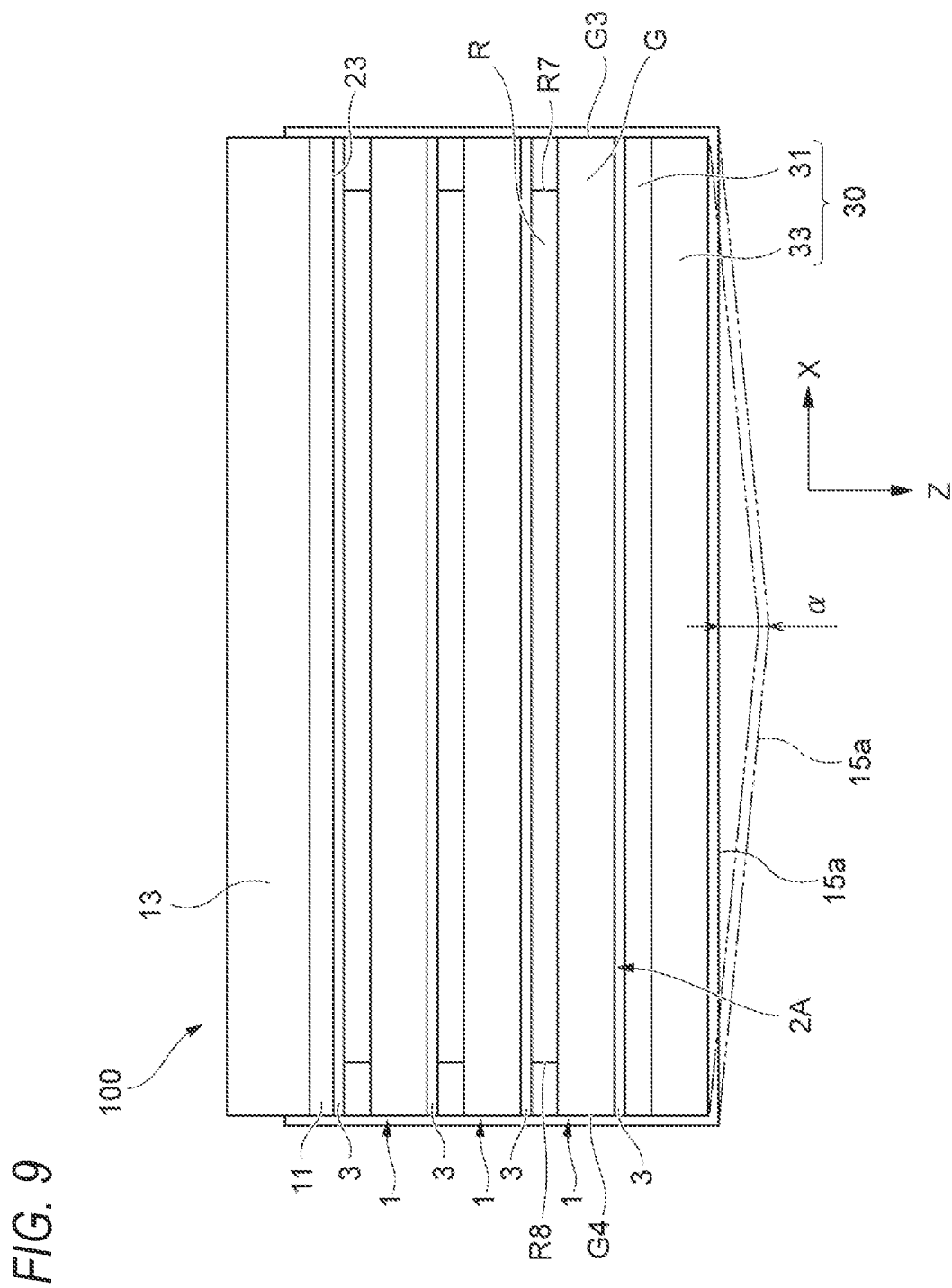
FIG. 9 is a schematic plan view of the packing body of the composite laminate according to the second embodiment.
Figure 10:
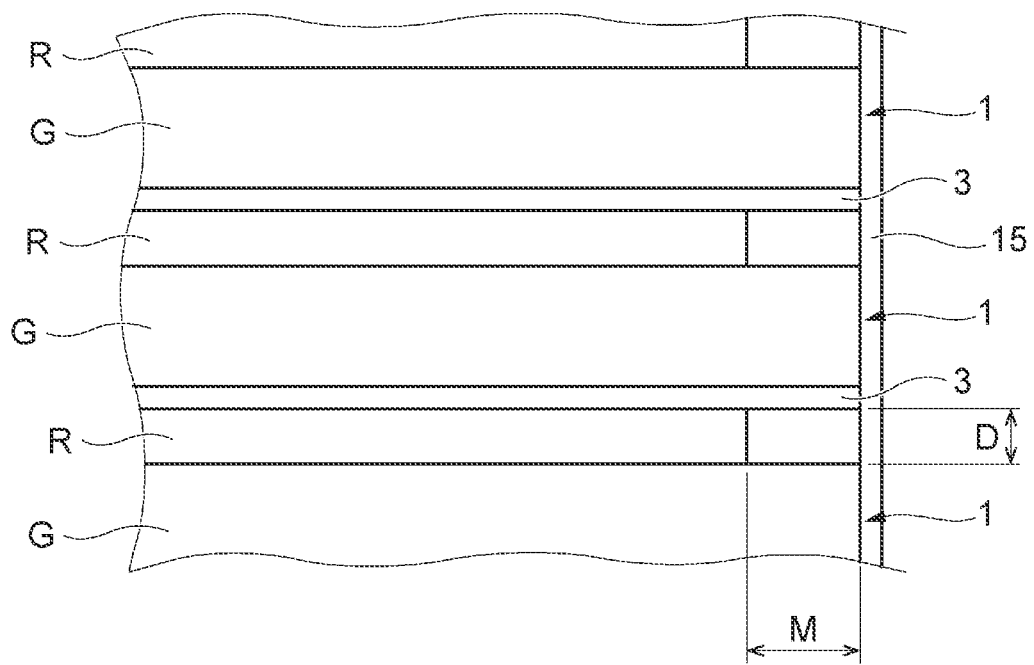
FIG. 10 is a schematic plan view of a part of the packing body of the composite laminate according to the second embodiment.

FIG. 8 is a schematic side view of a packing body of a composite laminate 2A according to the second embodiment. FIG. 9 is a schematic plan view of a packing body of the composite laminate 2A according to the second embodiment. FIG. 10 is a schematic plan view of a part of the packing body of the composite laminate 2A according to the second embodiment.

As illustrated in FIGS. 8 and 9, in the packing body of the composite laminate 2A according to the second embodiment, a protective sheet 3 is disposed on the resin film R side of the composite 1. The storage container 100 stores the composite laminate 2A obtained by laminating a plurality of composites 1 with the protective sheets 3 interposed between the composites.

The protective sheet 3 is a sheet that prevents close contact between the composites 1 and protects each of the composites 1. For example, a paper material, a resin material, or the like is used. In FIGS. 8 and 9, the protective sheet 3 has substantially the same size as the glass sheet G in the composite 1, and the size is not particularly limited as long as the protective sheet 3 has a size by which an entire surface of the resin film R can be covered. For example, the protective sheet 3 may be larger than the resin film R and smaller than the glass sheet G. The protective sheet 3 may be larger than the glass sheet G. In the case where the protective sheet 3 is larger than the glass sheet G, the protective sheet 3 protrudes from a side surface of the composite laminate 2A. The protective sheet 3 preferably has, for example, a rough surface with a smoothness of 18 seconds or less (JIS P 8119, 1976). A material (paper quality) having a small contact area is selected so that a resin component of the protective sheet 3 is transferred to the composite 1 and a paper skin pattern, a burn, a stain, or the like does not occur on the composite 1. A content of the resin component of the protective sheet 3 is preferably, for example, 0.05 mass % or less (JIS P 8205, 1976). A material (paper quality) that does not adversely affect the quality of the composite 1 itself due to the composite effect with the smoothness described above is selected.

In a state in which the first sides G1 of the glass sheets G are directed downward and are supported by the bottom supporting portion 17, the composites 1 are preferably laminated such that one main surface of a glass sheet G, on which the resin film R is disposed, faces another main surface of an adjacent glass sheet G (a surface on which the resin film R is not formed) with the protective sheet 3 interposed between the composites. In a state in which the first sides G1 of the glass sheets G, which are downward end surfaces, are brought into contact with and supported by the bottom supporting portion 17, and the main surfaces of the glass sheets G are inclined from the vertical direction, the composites 1 are placed in the storage container 100 as the composite laminate 2A in which the composites 1 are laminated on each other with the protective sheet 3 interposed between the composites.

In the composite laminate 2A, in the case where the resin films R of the composites 1 face the back receiving member 11 as described above, the other main surface (the surface on which the resin film R is not formed) of the glass sheet G becomes the front surface when each of the composites 1 is taken out from the storage container 100. Therefore, since the resin film R is not disposed on the take-out side of the glass sheet G, the glass sheet G can be easily gripped without being conscious of interference (contact) with the resin film R. As a result, the work of taking out the individual composites 1 from the composite laminate 2A can be simplified.

The composite laminate 2A placed in the storage container 100 is fastened between the pressing portion 30 and the back-surface supporting portion 10 by stretching the belt 15a across the front surface of the composite laminate 2, and is held by the back-surface supporting member 13 while being pressed against the back receiving member 11. Accordingly, the composite laminate 2A forms a packing body in which the composites 1 are laminated with the protective sheet 3 interposed between the composites and which is stored in the storage container 100. At this time, the fastening mechanism 15 fastens the composite laminate 2A such that the displacement a at a pulled location is 20 mm when the fastening mechanism 15 is pulled forward (Z direction) at 50 N at a center in the width direction (X direction) of the composite laminate 2A (see FIG. 9). Accordingly, the composites 1 constituting the composite laminate 2A are pressed against the back receiving member 11 of the storage container 100 in a state in which the composites 1 are laminated with the protective sheet 3 interposed between the composites, so that the composites 1 are favorably held.

As illustrated in FIG. 10, in the case of the composite laminate 2A in the state of the packing body, when viewed from the main-surface perpendicular direction (Z direction) perpendicular to the main surface of the glass sheet G of the composite 1, an end-to-end dimension M from an end portion of a glass plate G, which intersects the belt 15a and serves as the fastening position, to the nearest end of the resin film R is 5 mm or more and 30 mm or less. When the composite laminate 2A in the state of the packing body is viewed from the main-surface perpendicular direction (Z direction) perpendicular to the main surface of the glass sheet G of the composite 1, an average value of the gap distances D, each of which is a distance between a glass sheet G of an N-th composite 1 (N is an integer of 1 or more) from the top and a protective sheet 3 in contact with a resin film R disposed on a main surface of the glass sheet G of the N-th composite 1, is 20 μm or more and is 80% or less of a total thickness of a thickness of the resin film R before fastening (when no stress is applied) and a thickness of the protective sheet 3 before fastening (when no stress is applied), immediately below the end portion of the glass sheet G intersecting the belt 15a and serving as the fastening position.

In this manner, the composite laminate 2A is fastened with a strength such that the average value of the gap distances D, each of which is a distance between the glass sheet G of the composite laminate 2A and the protective sheet 3 in contact with the resin film R disposed on the main surface of glass sheet G, is 20 μm or more and is reduced to 80% or less of the total thickness of the resin film R and the protective sheet 3. Accordingly, the composite laminate 2A can be reliably fixed to the back-surface supporting member 13. In addition, even in the case where the composite laminate 2A is transported in a state of a packing body stored in the storage container 100, the movement of the composites 1 laminated with the protective sheets 3 interposed between the composites and the contact between the glass sheets G vua the protective sheet 3 interposed between the glass sheets are prevented. Therefore, deformation, cracks, and chips of the glass sheet G can be prevented.

Further, in the composite laminate 2A in the state of the packing body, a difference between a maximum value Emax and a minimum value Emin of the distances E between a reference plane Sb perpendicular to the X axis parallel to the first sides G1 of the glass sheet G and positions of the seventh sides R7 in the X axis direction as viewed from the reference plane Sb is 10 mm or less (see FIG. 7). For example, a difference between a maximum value Emax and a minimum value Emin of the distances E between a seventh side R7 of the resin film on a glass sheet G disposed farthest from the back-surface supporting member 13 among the plurality of glass sheet G in the composite laminate 2A and seventh sides R7 of the resin film on other glass sheets G is 10 mm or less. As described above, in the case of the composite laminate 2A, the variations in the positions in the lateral direction of the composites 1 laminated with the protective sheets 3 interposed between the composites are also prevented in the state of the packing body stored in the storage container 100. Accordingly, stress concentration on the glass sheets G due to lateral displacement of the composites 1 can be prevented.

As described above, according to the packing body of the composite laminate 2A in the second embodiment, the movement of the composites 1 and the contact between the glass sheets G during transportation can be prevented, and the deformation, cracks, and chips of the glass sheets G can be prevented.

Third Embodiment

Next, a packing body of a composite laminate according to the third embodiment will be described.

Figure 11:
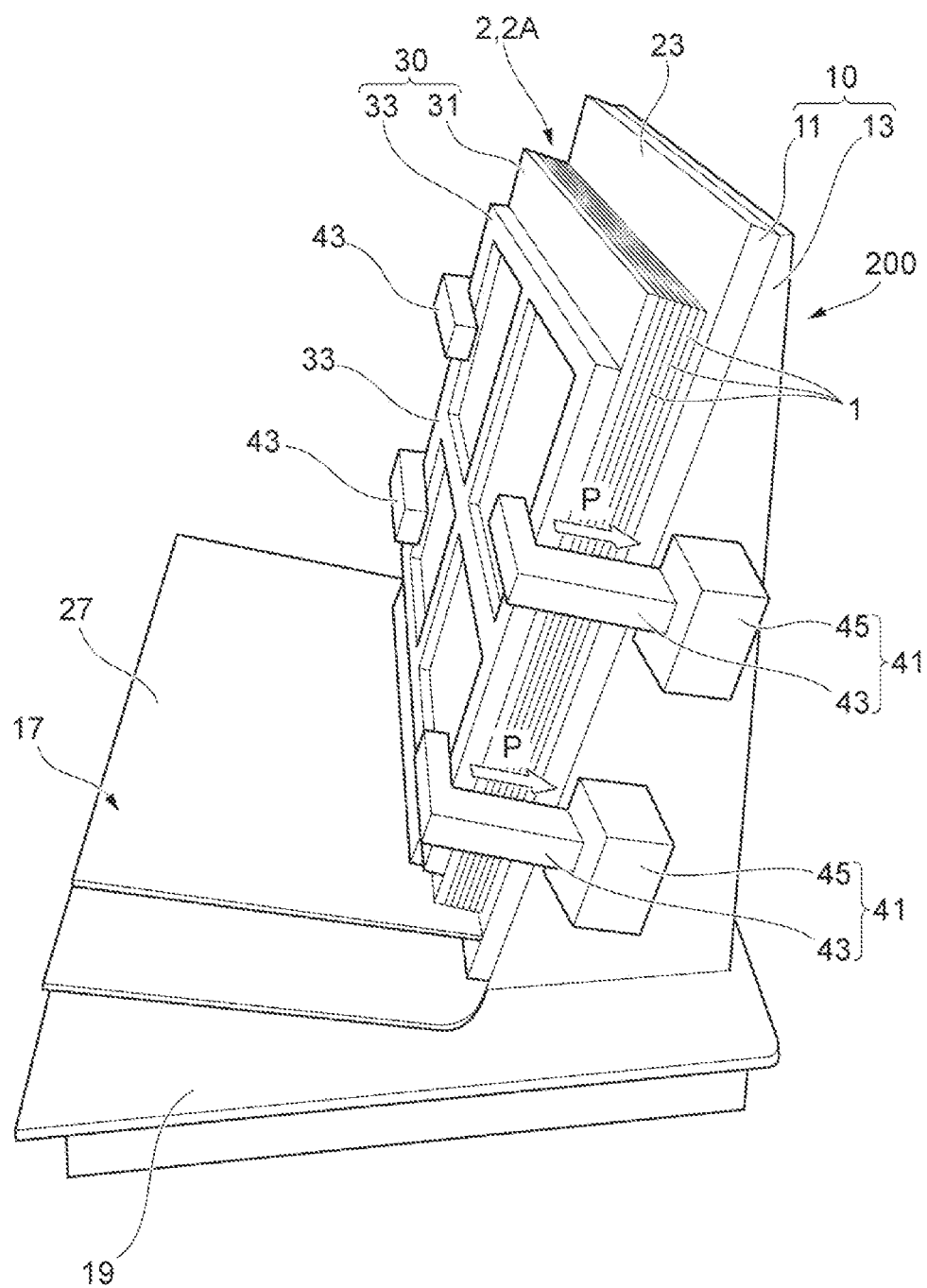
FIG. 11 is a perspective view illustrating a packing body of a composite laminate according to a third embodiment.

FIG. 11 is a perspective view illustrating the packing body of the composite laminate according to the third embodiment. The packing body of the composite laminate according to the third embodiment is a packing body formed by accommodating the composite laminate 2 or the composite laminate 2A (hereinafter, referred to as the composite laminate 2 or 2A) described above in a storage container 200. The storage container 200 has the same configuration as the storage container 100 except that the storage container 200 includes fastening mechanism 41 different from the fastening mechanism 15 of the storage container 100 illustrated in FIG. 1.

The fastening mechanisms 41 of this configuration are respectively provided at two locations at different height positions at each of both ends in the width direction of the back-surface supporting member 13. The fastening mechanisms 41 are implemented by a clamp mechanism including an engaging member 43 that engages with both ends in the width direction of the pressing frame 33, and a support portion 45 that supports the engaging member 43 in a manner of being capable of pulling the engaging member 43 toward the back-surface supporting member 13. The engaging member 43 is, for example, a rod having a distal end portion bent in an L shape, and the distal end portion thereof can be pressed against the pressing frame 33. The support portion 45 is provided on the back-surface supporting member 13, and supports the engaging member 43 such that the engaging member 43 can move forward and backward along the longitudinal direction thereof. When the engaging member 43 is moved in a direction of an arrow P, the pressing frame 33 is pressed against the back-surface supporting portion 10 side, and the composite laminate 2 or 2A set between the pressing portion 30 and the back-surface supporting portion 10 is fastened. In addition, the support portion 45 can release the fastening of the composite laminate 2 or 2A by releasing the engaging member 43.

The support portion 45 may be include an actuator such as a motor and an air cylinder as a drive source, or may include a mechanical lock mechanism using a one-way clutch, an appropriate gear, or the like. In the case where the actuator is used, a control unit (not illustrated) performs drive control so that a predetermined fastening force can be generated. In the case where the mechanical lock mechanism is used, for example, a mark or the like indicating a movement position at which a predetermined fastening force is obtained is provided, and the operator manually moves the pressing frame 33 to the position of the mark.

According to the fastening mechanism 41, a predetermined fastening force can be generated by a simple operation, and the composite laminate 2 or 2A can be easily fixed to and released from the back-surface supporting member 13.

Fourth Embodiment

Next, a packing body of a composite laminate according to the fourth embodiment will be described.

Figure 12:
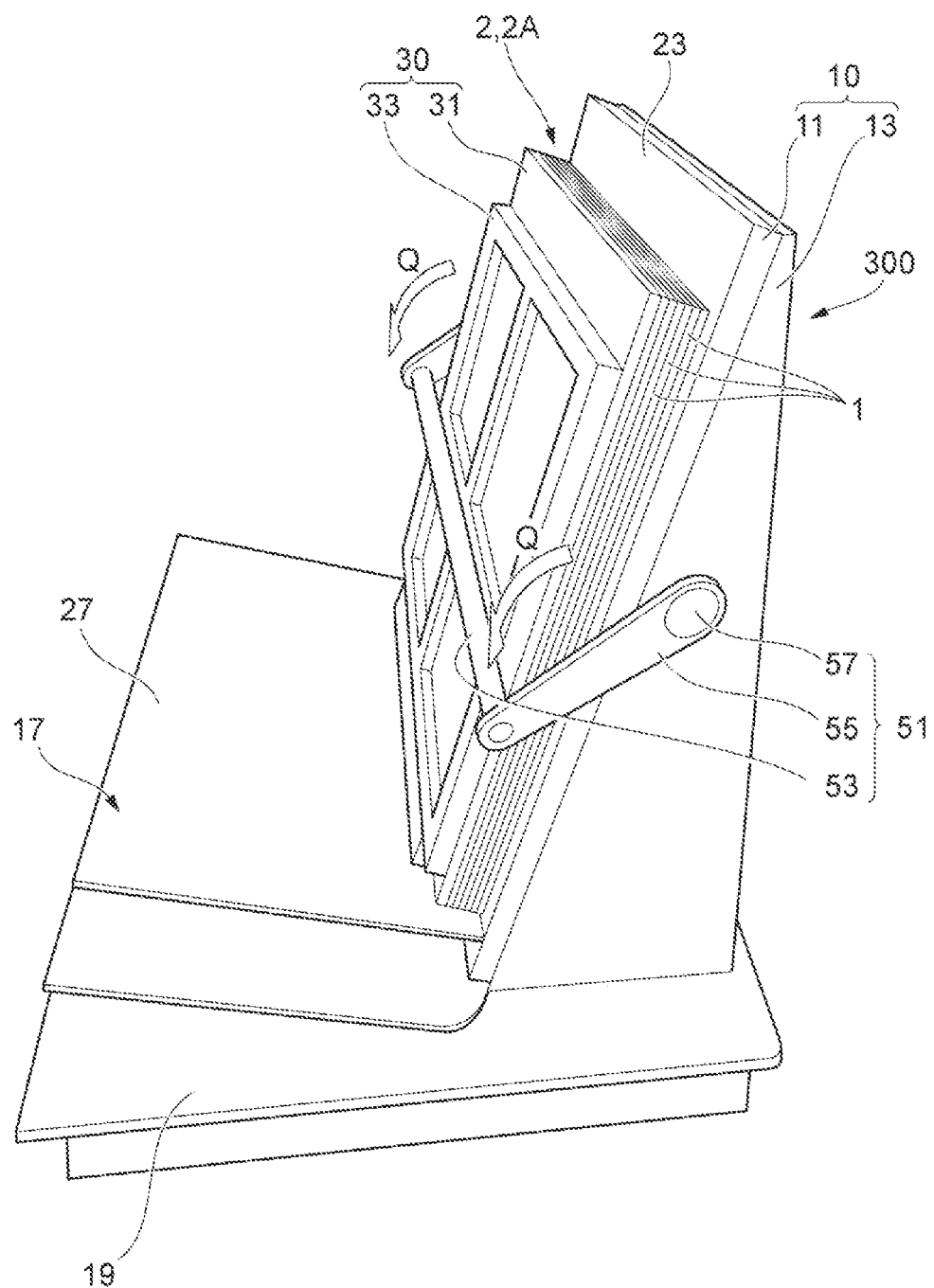
FIG. 12 is a perspective view illustrating a packing body of a composite laminate according to a fourth embodiment.

FIG. 12 is a perspective view illustrating the packing body of the composite laminate according to the fourth embodiment. The packing body of the composite laminate according to the fourth embodiment is a packing body formed by accommodating the composite laminate 2 or 2A described above in a storage container 300. The storage container 300 has the same configuration as the storage container 100 except that the storage container 300 includes a fastening mechanism 51 different from the fastening mechanism 15 of the storage container 100 illustrated in FIG. 1.

The fastening mechanism 51 of this configuration is implemented by an opening and closing bar mechanism including a bar 53 as a rod-shaped body disposed across the pressing frame 33 in the horizontal direction, arm 55 of which arm distal end portions are respectively connected to each of both ends of the bar 53, and support portions 57 that rotatably support base end portion of the arm 55 on the back-surface supporting member 13. When the fastening mechanism 51 is rotated as indicated by an arrow Q around the support portion 57 of the arm 55, the bar 53 can be pulled toward the back-surface supporting portion 10. In addition, the bar 53 is disposed in a vicinity of the center of the height of the composite laminate 2 or 2A.

Similar to the support portions 45 in the third embodiment, the support portions 57 may include an actuator or a mechanical lock mechanism. In either case, a predetermined fastening force can be generated by a simple operation, and the composite laminate 2, 2A can be easily fixed and released.

(Fastening Position of Composite Laminate)

The fastening mechanisms 15, 41, and 51 in the embodiments described above may be provided in only the central region in the vertical direction of the composite laminate 2 or 2A, in both the upper region and the lower region in an up-down direction, or in all the upper region, the central region, and the lower region, and fasten the composite laminate 2 or 2A at the respective positions.

Figure 13A:
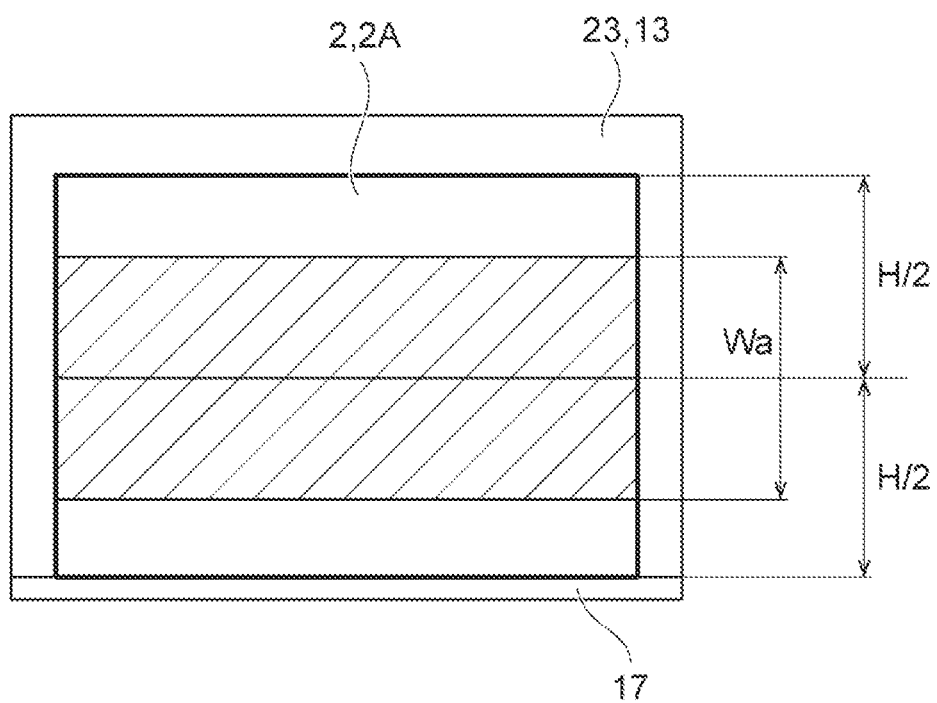
FIG. 13A is an illustration view schematically illustrating a fastening position of the composite laminate.
Figure 13B:
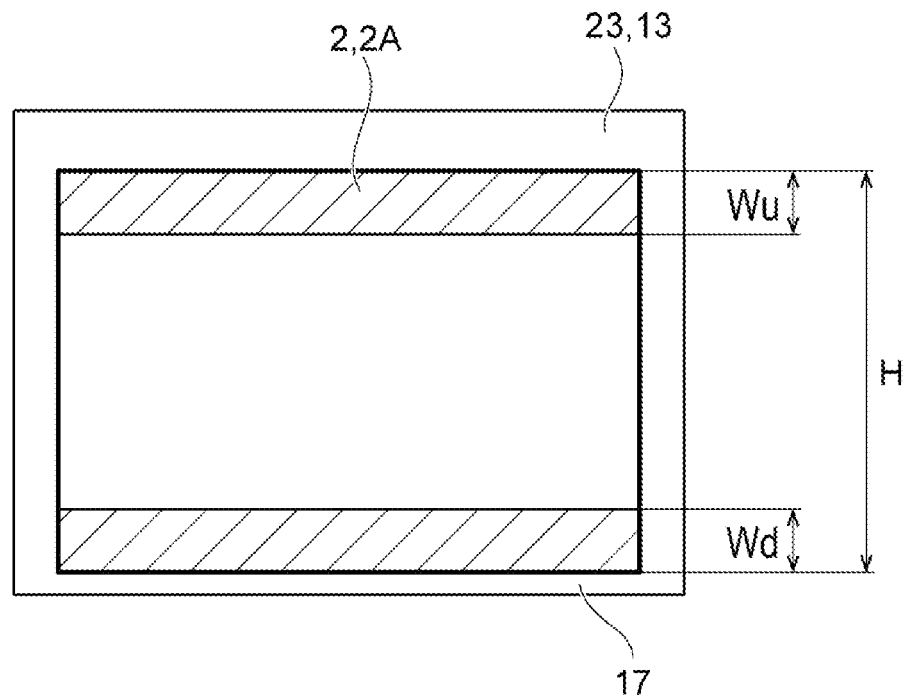
FIG. 13B is an illustration view schematically illustrating a fastening position of the composite laminate.

FIGS. 13A and 13B are illustration views schematically illustrating fastening positions of the composite laminate. As illustrated in FIG. 13A, the fastening position may be within a range (central region) of a width Wa around a central height position of the height H of the composite laminate 2 or 2A. The width Wa is preferably 80%, more preferably 60%, and further preferably 50% of the height H of the composite laminate 2 or 2A. In addition, as illustrated in FIG. 13B, the fastening position may be within both a range (upper region) having a width Wu from an upper end of the composite laminate 2 or 2A and within a range (lower region) having a width Wd from a lower end thereof. The widths Wu and Wd are preferably 10%, more preferably 8%, and further preferably 5% of the height H of the composite laminate 2 or 2A.

EXAMPLES

Regarding the packing bodies in Test Examples 1 to 25 which were different in the thickness of the second resin film Rb of the resin film R, the size of the resin film R, the end-to-end dimension between the glass sheet G and the resin film R, and a binding force generated by the fastening mechanism 15, the gap distance D between the facing sheet surfaces of the glass sheets G and the positional deviation of the resin films R were measured, and the load collapse after transportation and conveyance, the damage to the glass sheets G, and the deformed region in the first resin film Ra were observed and evaluated.

Each of Test Examples 1 to 11 was packing body (corresponding to the packing body in the first embodiment) in which the protective sheet 3 was not interposed, and each of Test Examples 12 to 25 was packing body (corresponding to the packing body in the second embodiment) in which the protective sheet 3 was interposed. Each of Test Examples 1 to 19 is result obtained by the fastening mechanism 15 including the belt 15a and the tension applying portion 15b illustrated in FIG. 1, each of Test Examples 20 to 22 is result obtained by the fastening mechanism 51 that is the opening and closing bar mechanism illustrated in FIG. 12, and each of Test Examples 23 to 25 is result obtained by the fastening mechanism 41 that is the clamp mechanism illustrated in FIG. 11. Test Examples 1 to 3, 5 and 6, 10 to 15, 18 and 19, 20, and 23 are Examples, and Test Examples 4, 7 to 9, 16 and 17, 21, 22, 24, and 25 are Comparative Examples.

(1) Preparation of Composite

A silicone resin was applied onto a surface of a resin film made of polyethylene terephthalate (PET, Young's modulus: 3.9 MPa), and cured by performing heating at 140° C. for 10 minutes using a hot plate to form a silicone resin film (thickness: 8 μm) on the resin film.

Subsequently, the resin film on which the silicone resin film was formed was washed with an aqueous glass washing agent ("PK-LCG213" manufactured by Parker Corporation), and then the resin film was bonded to a main surface of a glass sheet G washed with pure water. Accordingly, a composite 1 was produced, in which a resin film R having the silicone resin film as the first resin film Ra and the resin film as the second resin film Rb was disposed on the main surface of the glass sheet G.

The end-to-end dimension M from an end portion of the glass sheet G to an end portion of the resin film R is 5 mm in Test Examples 1 to 4, 8 to 14, and 17 to 25, and 30 mm in Test Examples 5 to 7, 15, and 16.

As the glass sheet G, a glass sheet made of alkali-free borosilicate glass having a size of 920 mm×730 mm and a thickness of 0.5 mm (trade name "AN Wizus" manufactured by AGC Co., Ltd., Young's modulus: 85 GPa) was used. The glass sheet G has a linear expansion coefficient of $39 \times 10^{-7}$/° C.

Next, the prepared composite 1 was placed in an autoclave, and heated under conditions of 65° C. and 1 MPa for 30 minutes to remove bubbles contained therein.

(2) Packing of Composite Laminate (2-1) Test Examples 1 to 11

The 200 produced composites 1 were laminated and stored in the storage container 100, thereby obtaining a packing body in which the composite laminate 2 was stored in the storage container 100.

An iron storage container was used as the storage container 100, a sponge sheet (EVA sheet) was bonded to the back receiving member 11 of the storage container 100, and a foamed polypropylene sheet was bonded thereon.

A composite 1 was placed in the storage container 100 such that a resin film R was in contact with the back receiving member 11 to which the sponge sheet and the foamed polypropylene sheet were bonded. Next, the other composites 1 were stacked on the composite 1, and 200 composites 1 were laminated. At this time, the lamination was performed such that a resin film R of an adjacent composite 1 was in contact with a main surface of a glass sheet G of a composite 1 placed in the storage container 100.

A foamed polypropylene sheet was placed on the 200th composite 1, a plastic cardboard plate was placed thereon, and the pressing frame 33 made of aluminum was further placed thereon.

Finally, the belt 15a, which is the fastening mechanism 15, was stretched across the pressing frame 33 on the front surface of the composite laminate 2 obtained by laminating 200 composites 1, and the composite laminate 2 was fastened by the tension applying portion 15b, thereby producing a packing body of the composite laminate 2.

In Test Examples 1 to 7 and Test Examples 10 and 11, fastening was performed such that the fastening mechanism 15 was pulled at 50 N at a center in the width direction of the composite laminate 2, and the displacement at the pulled location was 20 mm. In Test Examples 8 and 9, fastening was performed such that the fastening mechanism 15 was pulled at 20 N at a center in the width direction of the composite laminate 2, and the displacement at the pulled location was 20 mm.

(2-2) Test Examples 12 to 19

The 200 produced composites 1 were laminated and stored in the storage container 100 with the protective sheet 3 (virgin pulp interleaving paper, manufactured by Nagara Paper Manufacture Co. Ltd., basis weight: 50 g/m$^2$) being disposed on the resin film R side, thereby obtaining a packing body in which the composite laminate 2A was stored in the storage container 100.

An iron storage container was used as the storage container 100, a sponge sheet (EVA sheet) was bonded to the back receiving member 11 of the storage container 100, and a foamed polypropylene sheet was bonded thereon, similar to Test Examples 1 to 11.

A composite 1 was placed in the storage container 100 such that a protective sheet 3 having the same size as the glass sheet G of the composite 1 was placed on the back receiving member 11 to which the sponge sheet and the foamed polypropylene sheet were bonded, and a resin film R was in contact with the protective sheet 3. Next, a protective sheet 3 was placed on the composite 1, and another composite 1 was stacked such that a resin film R was in contact with the protective sheet 3. This stacking operation was repeated, and 200 composites 1 were laminated with the protective sheet 3 interposed between the composites.

A protective sheet 3 and a foamed polypropylene sheet were placed on the 200th composite 1, a plastic cardboard plate was placed thereon, and the pressing frame 33 made of aluminum was further placed thereon.

Finally, the belt 15a that was the fastening mechanism 15 was stretched across the pressing frame 33 on a front surface of the composite laminate 2A obtained by laminating the 200 composites 1 with the protective sheets 3 interposed between the composites, and the composite laminate 2A was fastened by the tension applying portion 15b, thereby producing a packing body of the composite laminate 2A.

In Test Examples 12 to 16 and Test Examples 18 and 19, fastening was performed such that the fastening mechanism 15 was pulled at 50 N at a center in the width direction of the composite laminate 2A, and the displacement at the pulled location was 20 mm. In Test Example 17, fastening was performed such that the fastening mechanism 15 was pulled at 20 N at a center in the width direction of the composite laminate 2, and the displacement at the pulled position was 20 mm.

(2-3) Test Examples 20 to 22

The 200 produced composites 1 were laminated and stored in the storage container 300 with the protective sheet 3 (virgin pulp interleaving paper, manufactured by Nagara Paper Manufacture Co. Ltd., basis weight: 50 g/m$^2$) being disposed on the resin film R side, thereby obtaining a packing body in which the composite laminate 2A was stored in the storage container 300.

An iron storage container was used as the storage container 300, a sponge sheet (EVA sheet) was bonded to the back receiving member 11 of the storage container 300, and a foamed polypropylene sheet was bonded thereon.

A composite 1 was placed in the storage container 300 such that a protective sheet 3 having the same size as the glass sheet G of the composite 1 was placed on the back receiving member 11 to which the sponge sheet and the foamed polypropylene sheet were bonded, and a resin film R was in contact with the protective sheet 3. Next, a protective sheet 3 was placed on the composite 1, and another composite 1 was stacked such that a resin film R was in contact with the protective sheet 3. This stacking operation was repeated, and 200 composites 1 were laminated with the protective sheet 3 interposed between the composites.

A protective sheet 3 and a foamed polypropylene sheet were placed on the 200th composite 1, a plastic cardboard plate was placed thereon, and the pressing frame 33 made of aluminum was further placed thereon.

Finally, the bar 53 (FIG. 12) formed of a metal rod was disposed across the pressing frame 33 on the front surface of the composite laminate 2A in which 200 composites 1 were laminated with the protective sheets 3 interposed between the composites, and the composite laminate 2A was fastened by rotating the arms 55 connected to the bar 53 by the support portions 57, thereby producing a packing body of the composite laminate 2A.

In Test Examples 20 and 21, the fastening strength generated by the support portion 57 was set to be strong, and in Test Example 22, the fastening strength generated by the support portion 57 was set to be weak.

(2-4) Test Examples 23 to 25

The 200 produced composites 1 were laminated and stored in the storage container 200 with the protective sheet 3 (virgin pulp interleaving paper, manufactured by Nagara Paper Manufacture Co. Ltd., basis weight: 50 g/m²) being disposed on the resin film R side, thereby obtaining a packing body in which the composite laminate 2A was stored in the storage container 200.

An iron storage container was used as the storage container 200, a sponge sheet (EVA sheet) was bonded to the back receiving member 11 of the storage container 200, and a foamed polypropylene sheet was bonded thereon.

A composite 1 was placed in the storage container 200 such that a protective sheet 3 having the same size as the glass sheet G of the composite 1 was placed on the back receiving member 11 to which the sponge sheet and the foamed polypropylene sheet were bonded, and a resin film R was in contact with the protective sheet 3. Next, a protective sheet 3 was placed on the composite 1, and another composite 1 was stacked such that a resin film R was in contact with the protective sheet 3. This stacking operation was repeated, and 200 composites 1 were laminated with the protective sheet 3 interposed between the composites.

A protective sheet 3 and a foamed polypropylene sheet were placed on the 200th composite 1, a plastic cardboard plate was placed thereon, and the pressing frame 33 made of aluminum was further placed thereon.

Finally, the composite laminate 2A was fastened by engaging the engaging member 43 with the upper portion and the lower portion in the height direction at both ends of the pressing frame 33 made of aluminum and pulling the engaging member 43 toward the back-surface supporting member 13 side, and a packing body of the composite laminate 2A was produced.

In Test Examples 23 and 24, the pulling force of the support portion 45 was set to be strong and the fastening strength for the composite laminate 2A was set to be strong, and in Test Example 25, the pulling force of the support portion 45 was set to be weak and the fastening strength for the composite laminate 2A was set to be weak.

(3) Measurement of Packing Body (3-1) Measurement of Distance Between Sheet Surfaces In the case of using the storage container 100, a feeler gauge (thickness gauge) was inserted directly below an end portion of a glass sheet G intersecting the belt 15a of the fastening mechanism 15 in an outer peripheral portion of the composites 1 laminated and stored in the storage container 100 when viewed from the main-surface perpendicular direction (Z-axis direction) of the glass sheet G, and the gap distance D was measured. In the case of using the storage container 200, the gap distance D was measured by inserting a gauge directly below an end portion of a glass sheet G intersecting the engaging member 43 of the fastening mechanism 41, and in the case of using the storage container 300, the gap distance D was measured by inserting a gauge directly below an end portion of a glass sheet G intersecting the bar 53 of the fastening mechanism 51. That is, the gap distance D is measured at the fastening position where the maximum fastening force generated by the fastening mechanisms 15, 41, and 51 acts. Here, the gap distances D were measured for the composites 1 every 10 sheets in the order of being laminated in the storage container 100, and an average value thereof was determined.

In the case of a packing body in which the protective sheet 3 was not used (Test Examples 1 to 11), a gap between the glass sheets G of the composite 1 was measured as the gap distance D. In the case of a packing body in which the protective sheet 3 was used (Test Examples 12 to 25), a gap between the glass sheet G of the composite 1 and the protective sheet 3 was measured as the gap distance D.

(3-2) Measurement of Positional Deviation of Resin Film

The positional deviation of the resin films R of the composites 1 laminated and stored in the storage containers 100, 200, and 300 was measured. In the measurement of the positional deviation of the resin films R, one side of a glass sheet G of the foremost composite 1 (the composite 1 mounted last) was set as a reference plane Sb, and distances E from the reference plane Sb to end portions of the resin films R of the composites 1 were measured (see FIG. 7). The distances E were measured for a total of 20 composites 1 every 10 composites in the order of being laminated in the storage containers 100, 200, and 300. A difference between the maximum value Emax and the minimum value Emin of the distances E measured for the 20 composites 1 was defined as a range of the distances E of the resin films R (positional deviation of the resin films R).

(4) Evaluation Method (4-1) Evaluation of Load Collapse

The positions of end portions of the composites 1 in the packing body transported and conveyed after the packing were checked. In the case where the positional deviation of the composite 1 was less than 15 mm, the determination was made as "A", and in the case where the positional deviation was 15 mm or more, the determination was made as "B". The transportation distance was at least 350 km or more.

(4-2) Evaluation of Scratches, Cracks and Chips of Composite

After the packing, the composite 1 was taken out from the transported and conveyed packing body, and the presence or absence of scratches, cracks, chips, and the like in the outer peripheral portions of the composites 1 was visually checked. A case where no scratch, crack, or chip was present was evaluated as A, and a case where scratches, cracks, or chips were present at one or more composites was evaluated as B.

(4-3) Evaluation of Deformed Region

After the packing, the composite 1 was taken out from the transported and conveyed packing body, and the composite 1 was irradiated with a high-luminance light source to visually observe a projected image (transmission image). A deformed region such as depression and wrinkle of the first resin film Ra were checked based on the projected image, and a distance from an end portion of the resin film R to a deformed region was measured. A case where the distance from the end portion of the resin film R to the deformed region was 5 mm or less was determined as S, a case where the distance was more than 5 mm and 10 mm or less was determined as A, and a case where the distance was more than 10 mm was determined as B. When a device is formed on the first resin film Ra, the deformed region of the first resin film Ra becomes a defective region for device production. Therefore, the deformed region is preferably within 10 mm or less from the end portion of the resin film R, and more preferably within 5 mm or less.

(5) Evaluation Results

Table 1 shows packing conditions, measurement results, and evaluation results of Test Examples 1 to 25.

TABLE 1

| | Binding method | Sheet | Thickness (A) of second resin film [mm] | Size of resin film [mm] | End-to-end dimension M from end portion of glass sheet to end portion of resin film [mm] | Thickness (B) of first resin film [μm] | Binding force [N] |
|---|---|---|---|---|---|---|---|
| Test Example 1 | Belt | No | 100 | 910 × 720 | 5 | 8 | 50 N |
| Test Example 2 | Belt | No | 50 | 910 × 720 | 5 | 8 | 50 N |
| Test Example 3 | Belt | No | 25 | 910 × 720 | 5 | 8 | 50 N |
| Test Example 4 | Belt | No | 12 | 910 × 720 | 5 | 8 | 50 N |
| Test Example 5 | Belt | No | 100 | 860 × 670 | 30 | 8 | 50 N |
| Test Example 6 | Belt | No | 50 | 860 × 670 | 30 | 8 | 50 N |
| Test Example 7 | Belt | No | 25 | 860 × 670 | 30 | 8 | 50 N |
| Test Example 8 | Belt | No | 100 | 910 × 720 | 5 | 8 | 20 N |
| Test Example 9 | Belt | No | 50 | 910 × 720 | 5 | 8 | 20 N |
| Test Example 10 | Belt | No | 50 | 910 × 720 | 5 | 8 | 50 N |
| Test Example 11 | Belt | No | 50 | 910 × 720 | 5 | 8 | 50 N |
| Test Example 12 | Belt | Yes | 100 | 910 × 720 | 5 | 8 | 50 N |
| Test Example 13 | Belt | Yes | 50 | 910 × 720 | 5 | 8 | 50 N |
| Test Example 14 | Belt | Yes | 25 | 910 × 720 | 5 | 8 | 50 N |
| Test Example 15 | Belt | Yes | 50 | 860 × 670 | 30 | 8 | 50 N |
| Test Example 16 | Belt | Yes | 25 | 860 × 670 | 30 | 8 | 50 N |
| Test Example 17 | Belt | Yes | 50 | 910 × 720 | 5 | 8 | 20 N |
| Test Example 18 | Belt | Yes | 50 | 910 × 720 | 5 | 8 | 50 N |
| Test Example 19 | Belt | Yes | 50 | 910 × 720 | 5 | 8 | 50 N |
| Test Example 20 | Opening and closing bar | Yes | 50 | 910 × 720 | 5 | 8 | Strong |
| Test Example 21 | Opening and closing bar | Yes | 12 | 910 × 720 | 5 | 8 | Strong |
| Test Example 22 | Opening and closing bar | Yes | 50 | 910 × 720 | 5 | 8 | Weak |
| Test Example 23 | Clamp | Yes | 50 | 910 × 720 | 5 | 8 | Strong |
| Test Example 24 | Clamp | Yes | 12 | 910 × 720 | 5 | 8 | Strong |
| Test Example 25 | Clamp | Yes | 50 | 910 × 720 | 5 | 8 | Weak |

| | Measurement results | | Evaluation Results | | |
|---|---|---|---|---|---|
| | C value (A+ B) × 0.8 [μm] | Average value of vertical distance (average value of gap distances D) [μm] | Range of positions of resin film (Range of distances E) [mm] | Load collapse | Scratches, cracks and chips of composite | Deformed region of first resin film |
| Test Example 1 | 86 | 82 | 4 | A | A | S |
| Test Example 2 | 46 | 44 | 2 | A | A | S |
| Test Example 3 | 26 | 22 | 5 | A | A | S |
| Test Example 4 | 16 | 17 | 2 | A | B | S |
| Test Example 5 | 86 | 59 | 3 | A | A | S |
| Test Example 6 | 46 | 33 | 3 | A | A | S |
| Test Example 7 | 26 | 15 | 2 | A | B | S |
| Test Example 8 | 86 | 90 | 4 | B | A | S |
| Test Example 9 | 46 | 52 | 3 | B | A | S |
| Test Example 10 | 46 | 41 | 8 | A | A | A |
| Test Example 11 | 46 | 40 | 11 | A | A | B |
| Test Example 12 | 86 | 79 | 3 | A | A | S |
| Test Example 13 | 46 | 40 | 2 | A | A | S |
| Test Example 14 | 26 | 20 | 5 | A | A | S |
| Test Example 15 | 46 | 34 | 3 | A | A | S |
| Test Example 16 | 26 | 12 | 2 | A | B | S |
| Test Example 17 | 46 | 50 | 3 | B | A | S |
| Test Example 18 | 46 | 44 | 8 | A | A | A |
| Test Example 19 | 46 | 40 | 13 | A | A | B |
| Test Example 20 | 46 | 43 | 1 | A | A | S |
| Test Example 21 | 16 | 16 | 3 | A | B | S |
| Test Example 22 | 46 | 50 | 2 | B | A | S |
| Test Example 23 | 46 | 42 | 4 | A | A | S |
| Test Example 24 | 16 | 15 | 3 | A | B | S |
| Test Example 25 | 46 | 48 | 3 | B | A | S |

(5-1) Evaluation Results of Load Collapse

When an average value of the gap distances D was compared with a C value that is a value obtained by multiplying, by 0.8 (80%), a thickness of the resin film R which is the sum of a thickness (A value) of the second resin film Rb and a thickness (B value) of the first resin film Ra, the average value of the gap distances D is equal to or less than the C value in Test Examples 1 to 3, 5 to 7, 10 to 16, 18 to 21, 23, and 24, and the average value of the gap distances D is more than the C value in Test Examples 4, 8, 9, 17, 22, and 25. When the average value of the gap distances D is equal to or less than the C value (Test Examples 1 to 3, 5 to 7, 10 to 16, 18 to 21, 23, and 24), the determination is made as "A" in the evaluation of the load collapse, and it can be seen that the load collapse does not occur. On the other hand, when the average value of the gap distances D is more than the C value (Test Examples 8, 9, 17, 22, and 25), the determination is made as "B" in the evaluation of the load collapse, and it can be seen that the load collapse occurs. In Test Example 4, the average value of the gap distances D was more than the C value, but the determination was made as "A" in the evaluation of the load collapse. (5-2) Evaluation Results of Scratches, Cracks and Chips of Composite In Test Examples 1 to 3, 5, 6, 8 to 15, 17 to 20, 22, 23, and 25, the average value of the gap distances D was 20 µm or more, and in Test Examples 4, 7, 16, 21, and 24, the average value of the gap distances D was less than 20 µm. In the case where the average value of the gap distances D is 20 µm or more (Test Examples 1 to 3, 5, 6, 8 to 15, 17 to 20, 22, 23, and 25), the determination was made as "A" in the evaluation of scratches, cracks, and chips of the composites 1, and it can be seen that the scratches or the like are not generated. On the other hand, in the case where the average value of the gap distances D is less than 20 µm (Test Examples 4, 7, 16, 21, and 24), the determination is made as "B" in the evaluation of scratches, cracks, and chips of the composites 1, and it can be seen that scratches or the like are generated in the composites 1.

(5-3) Evaluation Results of Deformed Region

In Test Examples 1 to 10, 12 to 18, and 20 to 25, the range of the distance E was 10 mm or less, and in Test Examples 11 and 19, the range of the distance E was more than 10 mm. In the case where the range of the distances E is 10 mm or less (Test Examples 1 to 10, 12 to 18, and 20 to 25), the determination is made as "S" or the determination is made as "A" in the evaluation of the deformed region of the first resin film Ra, and it can be seen that the deformed region of the first resin film Ra is reduced to a narrow range. On the other hand, in the case where the range of the distances E is more than 10 mm (Test Examples 11 and 19), the determination is made as "B" in the evaluation of the deformed region of the first resin film Ra, and it can be seen that a large deformed region is formed in the first resin film Ra.

From the above results, it can be seen that in the case where the average value of the gap distances D is 20 µm or more and is equal to or less than the C value, the load collapse can be prevented, and a packing body in which scratches, cracks, and chips do not occur can be obtained. In addition, it can be seen that in the case where the range of the distances E is set to 10 mm or less, the deformed region of the first resin film Ra can be prevented.

As described above, the present invention is not limited to the above-described embodiments, and combinations of the respective configurations of the embodiments and modifications and applications made by those skilled in the art based on the description of the specification and well-known techniques are also intended to be made by the present invention and are included in the scope required for protection.

As described above, the following matters are disclosed in the present specification.

(1) A packing body of a composite laminate, which supports, in a vertical posture, a composite laminate obtained by laminating a plurality of composites which each include a glass sheet and a resin film disposed on the main surface of a glass sheet, the packing body including:

a bottom supporting portion that is configured to support a downward end surface of the composite laminate;

a back-surface supporting portion that is configured to support a back surface side of the composite laminate in a state in which the main surface of the glass sheet is inclined from a vertical direction;

a pressing portion that is disposed on a front surface side opposite to the back surface side of the composite laminate and is in surface contact with the composite laminate; and a fastening mechanism that applies, at a fastening position in a part of the pressing portion, a fastening force to the composite laminate sandwiched between the pressing portion and the back-surface supporting portion, in which the fastening mechanism is provided in only a central region in an up-down direction of the composite laminate, in both of an upper region and a lower region in the up-down direction, or in all of the upper region, the central region, and the lower region, when the composite laminate is viewed from a main-surface perpendicular direction, which is a direction perpendicular to the main surface of the glass sheet, an end-to-end dimension from an end portion of the glass sheet in a region of the composite laminate corresponding to the fastening position to a nearest end portion of the resin film is 5 mm or more and 30 mm or less, and an average value of gap distances, each of which is a distance between facing sheet surfaces among a plurality of glass sheets adjacent to each other in a region of the composite laminate corresponding to the fastening position, is 20 µm or more and 80% or less of a thickness of the resin film before fastening.

According to the packing body of the composite laminate, the composite laminate including the laminate obtained by laminating the composites can be favorably held by the back-surface supporting portion by pressing the pressing portion disposed on the front surface side of the composite laminate toward the back-surface supporting portion side by the fastening mechanism.

At this time, in the packing body, when viewed from the main-surface perpendicular direction, the end-to-end dimension from an end portion of the glass sheet in a region corresponding to the fastening position to the nearest end portion of the resin film is 5 mm or more and 30 mm or less. The average value of the gap distances between the facing sheet surfaces of the plurality of glass sheets adjacent to each other in the region of the composite laminate corresponding to the fastening position is 20 µm or more and 80% or less of the thickness of the resin film before fastening.

Accordingly, even during transportation, the movement of the laminated composite and the contact between the glass sheets can be prevented, and the deformation, cracks, and chips of the glass sheet can be prevented.

(2) A packing body of a composite laminate, which supports, in a vertical posture, a composite laminate obtained by laminating a plurality of composites which each include a glass sheet and a resin film disposed on a main surface of the glass sheet, with a protective sheet interposed between the composites on the resin film side, the packing body including:

a bottom supporting portion that is configured to support a downward end surface of the composite laminate;

a back-surface supporting portion that is configured to support a back surface side of the composite laminate in a state in which the main surface of the glass sheet is inclined from a vertical direction;

a pressing portion that is disposed on a front surface side opposite to the back surface side of the composite laminate and is in surface contact with the composite laminate; and a fastening mechanism that applies, at a fastening position in a part of the pressing portion, a fastening force to the composite laminate sandwiched between the pressing portion and the back-surface supporting portion, in which the fastening mechanism is provided in only a central region in an up-down direction of the composite laminate, in both of an upper region and a lower region in the up-down direction, or in all of the upper region, the central region, and the lower region, when the composite laminate is viewed from a main-surface perpendicular direction, which is a direction perpendicular to the main surface of the glass sheet, an end-to-end dimension from an end portion of the glass sheet in the region of the composite laminate corresponding to the fastening position to a nearest end portion of the resin film is 5 mm or more and 30 mm or less, and an average value of gap distances, each of which is a distance between the glass sheet in the region of the composite laminate corresponding to the fastening position and the protective sheet in contact with the resin film disposed on the main surface of the glass sheet, is 20 µm or more and is 80% or less of a total thickness of the resin film and the protective sheet before fastening.

According to the packing body of the composite laminate, the composite laminate including the laminate obtained by laminating the composites with the protective sheet interposed between the composites can be favorably held by the back-surface supporting portion by pressing the pressing portion disposed on the front surface side of the composite laminate toward the back-surface supporting member by the fastening mechanism.

At this time, in the packing body, when viewed from the main-surface perpendicular direction, the end-to-end dimension from an end portion of the glass sheet in a region corresponding to the fastening position to the nearest end portion of the resin film is 5 mm or more and 30 mm or less. In addition, the average value of the gap distances, each of which is a distance between the glass sheet in the region of the composite laminate corresponding to the fastening position and the protective sheet in contact with the resin film disposed on the main surface of the glass sheet is 20 µm or more and is 80% or less of the total thickness of the resin film and the protective sheet before the fastening.

Accordingly, even during transportation, the movement of the composites laminated with the protective sheet interposed between the composites and the contact between the glass sheets can be prevented, and the deformation, cracks, and chips of the glass sheets can be prevented.

(3) The packing body of the composite laminate according to (1) or (2), in which an inclination angle of the main surface of the glass sheet from the vertical direction is 45° or more and 80° or less.

According to the packing body of the composite laminate, the composite laminate can be stably supported.

(4) The packing body of the composite laminate according to any one of (1) to (3), in which a point of action of the fastening force generated by the fastening mechanism includes an end portion region of the glass sheet.

According to the packing body of the composite laminate, the composite laminate is sandwiched between the pressing portion and the back-surface supporting portion by the fastening force acting on the end portion region of the glass sheet.

(5) The packing body of the composite laminate according to any one of (1) to (4), in which the fastening mechanism includes a belt which is stretched across the pressing portion and both end portions of which are fixed to the back-surface supporting portion, and a tension applying portion that is provided in a part of the belt and applies tension to the belt.

According to the packing body of the composite laminate, the composite laminate can be fastened between the pressing portion and the back-surface supporting portion by applying tension to the belt stretched across the pressing portion.

(6) The packing body of the composite laminate according to any one of (1) to (4), in which the fastening mechanism includes an engaging member that engages with both end portions of the pressing portion in a horizontal direction, and a support portion that supports the engaging member in a manner of being capable of pulling the engaging member toward the back-surface supporting member.

According to the packing body of the composite laminate, the composite laminate can be fastened between the pressing portion and the back-surface supporting portion by pulling the engaging member engaged with the pressing portion toward the back-surface supporting portion.

(7) The packing body of the composite laminate according to any one of (1) to (4), in which the fastening mechanism includes a rod-shaped body disposed across the pressing portion in a horizontal direction, an arm including arm distal end portions each connected to each of both ends of the rod-shaped body, and a support portion which rotatably supports a base end portion of the arm on the back-surface supporting portion, and the rod-shaped body comes into contact with the pressing portion and is pulled toward the back-surface supporting portion by rotation of the arms around the support portions.

According to the packing body of the composite laminate, the composite laminate can be fastened between the pressing portion and the back-surface supporting portion by pulling the rod-shaped body, which is disposed across the pressing portion in the horizontal direction, toward the back-surface supporting portion by the rotation of the arm.

(8) The packing body of the composite laminate according to any one of (1) to (7), in which when the glass sheet is viewed from the main-surface perpendicular direction, the glass sheet has a rectangular shape and includes a first side and a second side facing each other and a third side and a fourth side facing each other, when the resin film is viewed from the main-surface perpendicular direction, the resin film has a rectangular shape and includes a fifth side and a sixth side along the first side of the glass sheet and a seventh side and an eighth side along the third side of the glass sheet, the first side is in contact with the bottom supporting portion of the packing body, and a difference between a maximum value and a minimum value of distances between the seventh side of the resin film on a glass sheet disposed farthest from the back-surface supporting portion among the plurality of glass sheets and the seventh side of the resin film on another glass sheet is 10 mm or less in a direction along the first side of the glass sheet.

According to the packing body of the composite laminate, the variation in the position in the lateral direction of the laminated composite is prevented, and thus the stress concentration on the glass sheet due to the lateral deviation of the composites can be prevented.

(9) The packing body of the composite laminate according to any one of (1) to (8), in which the glass sheet has a thickness of 0.3 mm or more and 1.0 mm or less.

According to the packing body of the composite laminate, a plurality of composites each which includes the glass sheet having a thickness of 0.3 mm or more and 1.0 mm or less and the resin film disposed on the glass sheet can be transported while preventing deformation, cracks, chips, and the like.

(10) The packing body of the composite laminate according to any one of (1) to (9), in which the resin film has a thickness of 10 μm or more and 120 μm or less.

According to the packing body of the composite laminate, a plurality of composites which each include the glass sheet and the resin film having a thickness of 10 μm or more and 120 μm or less disposed on the glass sheet can be transported while preventing deformation, cracks, chips, and the like.

(11) The packing body of the composite laminate according to any one of (1) to (10), in which the glass sheet has a Young's modulus of 60 GPa or more and 95 GPa or less.

According to the packing body of the composite laminate, a plurality of composites which each include the glass sheet having a Young's modulus of 60 GPa or more and 95 GPa or less and the resin film disposed on the glass sheet can be transported while preventing deformation, cracks, chips, and the like.

(12) The packing body of the composite laminate according to any one of (1) to (11), in which the resin film has a Young's modulus of 0.1 GPa or more and 7 GPa or less.

According to the packing body of the composite laminate, a plurality of composites which each include the glass sheet and the resin film having a Young's modulus of 0.1 GPa or more and 7 GPa or less disposed on the glass sheet can be transported while preventing deformation, cracks, chips, and the like.

(13) The packing body of the composite laminate according to any one of (1) to (12), in which the resin film includes a first resin film on which an electronic device member is to be formed, and a second resin film releasably formed on the first resin film.

According to the packing body of the composite laminate, a plurality of composites which each include the glass sheet and the resin film, disposed on the glass sheet, including the first resin film on which the electronic device member is to be formed and the second resin film releasably formed on the first resin film can be transported while preventing deformation, cracks, chips, and the like. In addition, the first resin film on which the electronic device member is to be formed can be protected by the second resin film that can be released from the first resin film.

The present application is based on Japanese Patent Application No. 2021-202049 filed on Dec. 13, 2021 and Japanese Patent Application No. 2022-161252 filed on Oct. 5, 2022, and the contents thereof are incorporated herein by reference.

1 Composite
2, 2A Composite laminate
3 Protective sheet
10 Back-surface supporting portion
11 Back receiving member
13 Back-surface supporting member
15 Fastening mechanism
15a Belt
15b Tension applying portion
17 Bottom supporting portion
Pressing portion
33 Pressing frame
41 Fastening mechanism
43 Engaging member
45 Support portion
51 Fastening mechanism
53 Bar
55 Arm
57 Support portion
D Gap distance
E Distance
G Glass sheet
G1 First side
G2 Second side
G3 Third side
G4 Fourth side
M End-to-end dimension
R Resin film
Ra First resin film
Rb Second resin film
R5 Fifth side
R6 Sixth side
R7 Seventh side
R8 Eighth side
Sb Reference plane
θ Inclination angle

What is claimed is:

1. A packing body of a composite laminate, which supports, in a vertical posture, a composite laminate obtained by laminating a plurality of composites which each comprise a glass sheet and a resin film disposed on a main surface of the glass sheet, the packing body comprising:
   a bottom supporting portion that is configured to support a downward end surface of the composite laminate;
   a back-surface supporting portion that is configured to support a back surface side of the composite laminate in a state in which the main surface of the glass sheet is inclined from a vertical direction;
   a pressing portion that is disposed on a front surface side opposite to the back surface side of the composite laminate and is in surface contact with the composite laminate; and
   a fastening mechanism that applies, at a fastening position in a part of the pressing portion, a fastening force to the composite laminate sandwiched between the pressing portion and the back-surface supporting portion,
   wherein the fastening mechanism is provided in only a central region in an up-down direction of the composite laminate, in both of an upper region and a lower region in the up-down direction, or in all of the upper region, the central region, and the lower region,
   when the composite laminate is viewed from a main-surface perpendicular direction, which is a direction perpendicular to the main surface of the glass sheet, an end-to-end dimension from an end portion of the glass sheet in a region of the composite laminate corresponding to the fastening position to a nearest end portion of the resin film is 5 mm or more and 30 mm or less, and
   an average value of gap distances, each of which is a distance between facing sheet surfaces among a plurality of glass sheets adjacent to each other in the region of the composite laminate corresponding to the fastening position, is 20 μm or more and 80% or less of a thickness of the resin film before fastening.

2. A packing body of a composite laminate, which supports, in a vertical posture, a composite laminate obtained by laminating a plurality of composites which each comprise a glass sheet and a resin film disposed on a main surface of the glass sheet, with a protective sheet interposed between the composites on the resin film side, the packing body comprising:
   a bottom supporting portion that is configured to support a downward end surface of the composite laminate;
   a back-surface supporting portion that is configured to support a back surface side of the composite laminate in a state in which the main surface of the glass sheet is inclined from a vertical direction;
   a pressing portion that is disposed on a front surface side opposite to the back surface side of the composite laminate and is in surface contact with the composite laminate; and
   a fastening mechanism that applies, at a fastening position in a part of the pressing portion, a fastening force to the composite laminate sandwiched between the pressing portion and the back-surface supporting portion,
   wherein the fastening mechanism is provided in only a central region in an up-down direction of the composite laminate, in both of an upper region and a lower region in the up-down direction, or in all of the upper region, the central region, and the lower region,
   when the composite laminate is viewed from a main-surface perpendicular direction, which is a direction perpendicular to the main surface of the glass sheet, an end-to-end dimension from an end portion of the glass sheet in a region of the composite laminate corresponding to the fastening position to a nearest end portion of the resin film is 5 mm or more and 30 mm or less, and
   an average value of gap distances, each of which is a distance between the glass sheet in the region of the composite laminate corresponding to the fastening position and the protective sheet in contact with the resin film disposed on the main surface of the glass sheet, is 20 μm or more and is 80% or less of a total thickness of the resin film and the protective sheet before fastening.

3. The packing body of the composite laminate according to claim 1, wherein an inclination angle of the main surface of the glass sheet from the vertical direction is 450 or more and 800 or less.

4. The packing body of the composite laminate according to claim 2, wherein an inclination angle of the main surface of the glass sheet from the vertical direction is 45° or more and 800 or less.

5. The packing body of the composite laminate according to claim 1, wherein a point of action of the fastening force generated by the fastening mechanism comprises an end portion region of the glass sheet.

6. The packing body of the composite laminate according to claim 2, wherein a point of action of the fastening force generated by the fastening mechanism comprises an end portion region of the glass sheet.

7. The packing body of the composite laminate according to claim 1, wherein the fastening mechanism comprises a belt which is stretched across the pressing portion and both end portions of which are fixed to the back-surface supporting portion, and a tension applying portion that is provided in a part of the belt and applies tension to the belt.

8. The packing body of the composite laminate according to claim 2, wherein the fastening mechanism comprises a belt which is stretched across the pressing portion and both end portions of which are fixed to the back-surface supporting portion, and a tension applying portion that is provided in a part of the belt and applies tension to the belt.

9. The packing body of the composite laminate according to claim 1, wherein the fastening mechanism comprises an engaging member that engages with both end portions of the pressing portion in a horizontal direction, and a support portion that supports the engaging member in a manner of being capable of pulling the engaging member toward the back-surface supporting member.

10. The packing body of the composite laminate according to claim 2, wherein the fastening mechanism comprises an engaging member that engages with both end portions of the pressing portion in a horizontal direction, and a support portion that supports the engaging member in a manner of being capable of pulling the engaging member toward the back-surface supporting member.

11. The packing body of the composite laminate according to claim 1,
   wherein the fastening mechanism comprises a rod-shaped body disposed across the pressing portion in a horizontal direction, an arm comprising arm distal end portions each connected to each of both ends of the rod-shaped body, and a support portion which rotatably supports a base end portion of the arm on the back-surface supporting portion, and
   the rod-shaped body comes into contact with the pressing portion and is pulled toward the back-surface supporting portion by rotation of the arms around the support portions.

12. The packing body of the composite laminate according to claim 2,
   wherein the fastening mechanism comprises a rod-shaped body disposed across the pressing portion in a horizontal direction, an arm comprising arm distal end portions each connected to each of both ends of the rod-shaped body, and a support portion which rotatably supports a base end portion of the arm on the back-surface supporting portion, and
   the rod-shaped body comes into contact with the pressing portion and is pulled toward the back-surface supporting portion by rotation of the arms around the support portions.

13. The packing body of the composite laminate according to claim 1,
   wherein when the glass sheet is viewed from the main-surface perpendicular direction, the glass sheet has a rectangular shape and comprises a first side and a second side facing each other and a third side and a fourth side facing each other,
   when the resin film is viewed from the main-surface perpendicular direction, the resin film has a rectangular shape and comprises a fifth side and a sixth side along the first side of the glass sheet and a seventh side and an eighth side along the third side of the glass sheet,
   the first side is in contact with the bottom supporting portion of the packing body, and
   a difference between a maximum value and a minimum value of distances between the seventh side of the resin film on a glass sheet disposed farthest from the back-surface supporting portion among the plurality of glass sheets and the seventh side of the resin film on another glass sheet is 10 mm or less in a direction along the first side of the glass sheet.

14. The packing body of the composite laminate according to claim 2,
wherein when the glass sheet is viewed from the main-surface perpendicular direction, the glass sheet has a rectangular shape and comprises a first side and a second side facing each other and a third side and a fourth side facing each other,
when the resin film is viewed from the main-surface perpendicular direction, the resin film has a rectangular shape and comprises a fifth side and a sixth side along the first side of the glass sheet and a seventh side and an eighth side along the third side of the glass sheet,
the first side is in contact with the bottom supporting portion of the packing body, and
a difference between a maximum value and a minimum value of distances between the seventh side of the resin film on a glass sheet disposed farthest from the back-surface supporting portion among the plurality of glass sheets and the seventh side of the resin film on another glass sheet is 10 mm or less in a direction along the first side of the glass sheet.

15. The packing body of the composite laminate according to claim 1, wherein the glass sheet has a thickness of 0.3 mm or more and 1.0 mm or less.

16. The packing body of the composite laminate according to claim 2, wherein the glass sheet has a thickness of 0.3 mm or more and 1.0 mm or less.

17. The packing body of the composite laminate according to claim 1, wherein the resin film has a thickness of 10 µm or more and 120 µm or less.

18. The packing body of the composite laminate according to claim 2, wherein the resin film has a thickness of 10 µm or more and 120 µm or less.

19. The packing body of the composite laminate according to claim 1, wherein the glass sheet has a Young's modulus of 60 GPa or more and 95 GPa or less.

20. The packing body of the composite laminate according to claim 2, wherein the glass sheet has a Young's modulus of 60 GPa or more and 95 GPa or less.

21. The packing body of the composite laminate according to claim 1, wherein the resin film has a Young's modulus of 0.1 GPa or more and 7 GPa or less.

22. The packing body of the composite laminate according to claim 2, wherein the resin film has a Young's modulus of 0.1 GPa or more and 7 GPa or less.

23. The packing body of the composite laminate according to claim 1, wherein the resin film comprises a first resin film on which an electronic device member is to be formed, and a second resin film releasably formed on the first resin film.

24. The packing body of the composite laminate according to claim 2, wherein the resin film comprises a first resin film on which an electronic device member is to be formed, and a second resin film releasably formed on the first resin film.

* * * * *